(12) United States Patent
Astete et al.

(10) Patent No.: US 9,870,238 B2
(45) Date of Patent: Jan. 16, 2018

(54) METHOD, MEDIUM, AND SYSTEM FOR MULTITENANT HOSTED VIRTUAL MACHINE INFRASTRUCTURE

(71) Applicant: Skytap, Seattle, WA (US)

(72) Inventors: Nicholas Luis Astete, Seattle, WA (US); Aaron Benjamin Brethorst, Seattle, WA (US); Joseph Michael Goldberg, Seattle, WA (US); Matthew Hanlon, Seattle, WA (US); Anthony A. Hutchinson, Jr., Seattle, WA (US); Gopalakrishnan Janakiraman, Bellevue, WA (US); Alexander Kotelnikov, Saint-Petersburg (RU); Petr Novodvorskiy, Seattle, WA (US); David William Richardson, Seattle, WA (US); Roxanne Camille Skelly, Seattle, WA (US); Nikolai Slioussar, Seattle, WA (US); Jonathan Weeks, Vashon, WA (US)

(73) Assignee: Skytap, Seattle, WA (US)

( * ) Notice: Subject to any disclaimer, the term of this patent is extended or adjusted under 35 U.S.C. 154(b) by 531 days.

(21) Appl. No.: 13/627,794

(22) Filed: Sep. 26, 2012

(65) Prior Publication Data

US 2013/0144744 A1    Jun. 6, 2013

Related U.S. Application Data

(62) Division of application No. 12/434,621, filed on May 2, 2009.

(Continued)

(51) Int. Cl.
*G06F 9/455* (2006.01)
*H04L 29/06* (2006.01)
(Continued)

(52) U.S. Cl.
CPC .......... *G06F 9/455* (2013.01); *G06F 9/45533* (2013.01); *G06F 9/45558* (2013.01);
(Continued)

(58) Field of Classification Search
CPC .......... G06Q 30/0601; G06Q 30/0641; G06Q 30/02; G06Q 30/0603; G06Q 40/02;
(Continued)

(56) References Cited

U.S. PATENT DOCUMENTS 5,915,098 A * 6/1999 Palmer .................. G06F 3/1415
345/601
5,922,044 A    7/1999 Banthia
(Continued)

OTHER PUBLICATIONS

May 2006—http://www.webhostingtalk.com/showthread.php?t=516601.*
(Continued)

*Primary Examiner* — Matthew Zimmerman
(74) *Attorney, Agent, or Firm* — Perkins Coie LLP

(57) ABSTRACT

A multi-tenant virtual machine infrastructure (MTVMI) allows multiple tenants to independently access and use a plurality of virtual computing resources via the Internet. Within the MTVMI, different tenants may define unique configurations of virtual computing resources and unique rules to govern the use of the virtual computing resources. The MTVMI may be configured to provide valuable services for tenants and users associated with the tenants.

8 Claims, 52 Drawing Sheets

Tenant Interface for Monitoring Resource Usage in MTVMI

Related U.S. Application Data

(60) Provisional application No. 61/050,163, filed on May 2, 2008, provisional application No. 61/101,665, filed on Sep. 30, 2008.

(51) Int. Cl.

| | | |
|---|---|---|
| *G06F 9/50* | (2006.01) | |
| *G06F 21/62* | (2013.01) | |
| *G06Q 30/02* | (2012.01) | |
| *G06Q 30/06* | (2012.01) | |
| *G06Q 40/02* | (2012.01) | |
| *G06F 9/445* | (2006.01) | |

(52) U.S. Cl.
CPC ........ *G06F 9/5077* (2013.01); *G06F 21/6218* (2013.01); *G06Q 30/02* (2013.01); *G06Q 30/0601* (2013.01); *G06Q 30/0603* (2013.01); *G06Q 40/02* (2013.01); *H04L 63/10* (2013.01); *G06F 9/44505* (2013.01); *G06F 2009/4557* (2013.01); *G06F 2009/45562* (2013.01); *G06F 2201/84* (2013.01)

(58) Field of Classification Search
CPC .. G06F 9/455; G06F 9/45533; G06F 9/45558; G06F 9/5077; G06F 21/6218; G06F 9/44505; G06F 2009/4557; G06F 2201/84; H04L 63/10
USPC ............................... 705/26.1, 27.1
See application file for complete search history.

(56) References Cited

U.S. PATENT DOCUMENTS

| | | | |
|---|---|---|---|
| 6,088,766 A | | 7/2000 | Bachmat et al. |
| 6,453,392 B1 | | 9/2002 | Flynn, Jr. |
| 6,766,371 B1 | | 7/2004 | Hipp et al. |
| 7,085,883 B1 | | 8/2006 | Dalgic et al. |
| 7,093,086 B1 | | 8/2006 | van Rietschote |
| 7,331,791 B2 | | 2/2008 | Rowley et al. |
| 7,506,265 B1 | | 3/2009 | Traut et al. |
| 7,536,541 B2 | | 5/2009 | Isaacson |
| 7,577,722 B1 | | 8/2009 | Khandekar et al. |
| 7,681,200 B2 | | 3/2010 | Wong |
| 7,698,706 B2 | | 4/2010 | Bantz et al. |
| 7,793,288 B2 | | 9/2010 | Sameske |
| 7,865,782 B2 | | 1/2011 | Terashima et al. |
| 7,877,485 B2 | | 1/2011 | Piper et al. |
| 7,984,449 B2 | | 7/2011 | Baran et al. |
| 8,015,563 B2 | | 9/2011 | Araujo, Jr. et al. |
| 8,028,048 B2 | | 9/2011 | Karve et al. |
| 8,108,858 B2 | | 1/2012 | Bantz et al. |
| 8,146,078 B2 | | 3/2012 | Bennett et al. |
| 8,161,475 B2 | | 4/2012 | Araujo, Jr. et al. |
| 8,200,796 B1 | | 6/2012 | Margulis |
| 8,209,408 B1 | | 6/2012 | Huang et al. |
| 8,374,929 B1 | * | 2/2013 | Lappas ................. G06Q 10/06 370/219 |
| 2002/0107809 A1 | * | 8/2002 | Biddle ................... G06Q 10/10 705/59 |
| 2004/0068447 A1 | * | 4/2004 | Mao ....................... G06Q 30/06 705/26.1 |
| 2004/0117224 A1 | * | 6/2004 | Agarwal ............ G06Q 20/1235 705/412 |
| 2004/0249885 A1 | * | 12/2004 | Petropoulakis ........... G06F 9/54 709/204 |
| 2005/0120160 A1 | | 6/2005 | Plouffe et al. |
| 2006/0136912 A1 | | 6/2006 | Robinson et al. |
| 2006/0190532 A1 | | 8/2006 | Chadalavada |
| 2006/0265711 A1 | | 11/2006 | Bantz et al. |
| 2007/0078988 A1 | | 4/2007 | Miloushev et al. |
| 2007/0089111 A1 | | 4/2007 | Robinson et al. |
| 2007/0171921 A1 | | 7/2007 | Wookey et al. |
| 2007/0180381 A1 | | 8/2007 | Rice et al. |
| 2007/0234302 A1 | | 10/2007 | Suzuki et al. |
| 2007/0250833 A1 | | 10/2007 | Araujo et al. |
| 2007/0260702 A1 | | 11/2007 | Richardson et al. |
| 2008/0022376 A1 | | 1/2008 | Ke et al. |
| 2008/0104222 A1 | * | 5/2008 | Brans ................. G06F 9/4862 709/224 |
| 2008/0196043 A1 | | 8/2008 | Feinleib et al. |
| 2008/0209016 A1 | | 8/2008 | Karve et al. |
| 2009/0049453 A1 | | 2/2009 | Baran et al. |
| 2009/0241030 A1 | | 9/2009 | von Eicken et al. |
| 2009/0241108 A1 | | 9/2009 | Edwards et al. |
| 2009/0288084 A1 | | 11/2009 | Astete et al. |
| 2009/0300149 A1 | * | 12/2009 | Ferris ..................... G06F 15/177 709/222 |
| 2009/0300152 A1 | * | 12/2009 | Ferris ..................... G06F 9/5072 709/223 |
| 2009/0319580 A1 | | 12/2009 | Lorenz et al. |
| 2009/0327471 A1 | | 12/2009 | Astete et al. |
| 2010/0138830 A1 | | 6/2010 | Astete et al. |
| 2010/0235831 A1 | | 9/2010 | Dittmer |
| 2012/0096158 A1 | | 4/2012 | Astete et al. |
| 2013/0013738 A1 | | 1/2013 | Astete et al. |

OTHER PUBLICATIONS

U.S. Appl. No. 13/619,959, filed Sep. 14, 2012, Astete et al.
U.S. Appl. No. 13/627,761, filed Sep. 26, 2012, Astete et al.
Declaration of Matthew Hanlon, Oct. 10, 2012, 29 pages.

* cited by examiner

FIG. 9

Pacific Retail - Security Verification - Skytap Virtual Lab - Mozilla Firefox

File  Edit  View  Favorites  Tools  Help

Skytap VIRTUAL LAB

User A Company A    My Account    Sign out    Help

1005 — Dashboard | Projects | Lab | Library | Assets | Admin

Edit Users

1010 — Security Verification
Created on: Date
Summary: Company A needs to ensure that the privacy of our customers is guarded. This project will verify that credit card number, social security numbers and the like cannot be exposed from our public web site
Recent Activity: Date
 • Publish configuration performed by User A on Company A - Build 1342
 • Publish configuration performed by User A on Company A - Build 1342
 • Suspend configuration performed by User A on Company A - Build 1342

1015 — Configurations

| Name | Created on | |
|---|---|---|
| Windows Server 2003 32 bit - Selenium 0.92 Remote Control | Date | X |
| Windows 2003 Server - Test Client | Date | X |
| Ubuntu (Gutsy Gibbon 7.10) - Test Client | Date | X |

⊕ Add Configuration from Library

1020 — Running Configurations

Company A - Build 1342    Created on Fri Apr 04, 2008 X

⊕ Add Running Configuration

1025 — Assets

| Name | Size | Created at | | |
|---|---|---|---|---|
| jmeter-5.2.zip | 2.2 MB | Sun Apr 06, 2008 | Download | Remove |
| selenium-rc-0.92.zip | 1.8 MB | Sun Apr 06, 2008 | Download | Remove | https://www.skytap.com/default/configuration_instance/57    www.skytap.com

Skytap VIRTUAL LAB

User A (Company A)  My Account  Sign out

| Dashboard | Library | Lab | Assets | Projects | Admin | | ? Help |

What's New — 2300

My Projects

| Project Name | Latest Activity |
|---|---|
| man'ka zolotaya ruchka | Run configuration performed by rs_bobo on Windos Server 2003 Standard RB SP2 |

View Projects >>

My Library
Go to the Library >>

My Lab

| Configuration | Created on |
|---|---|
| Windows Server 2003 Standard R2 SP2 | Mon Jan 12, 2009 |

Go to the Lab >>

2301  2302

Company Quotas — 2310

| Quota | Usage | Limit |
|---|---|---|
| SMV hours (?) | 5 | 1000 |
| SVMs (?) | 2 | 100 |
| Storage | 40.0 GB | 1000.0 GB |
| Public IP Addresses | 0 | 5 |

2311
2312
2313
2314

My Quotas — 2311

| Quota | Usage | Limit |
|---|---|---|
| SMV hours (?) | 1 | 20 |
| SVMs (?) | 0 | 10 |
| Storage | 10.0 GB | 100.0 GB |

2321
2322
2323

Popular Help Topics

1. What's New in December Release
2. Introduction Virtual Lab
3. Networking Overview
4. File Management & Transfers
5. Video demos on Skytap's Web site

2350

| | SMVs | SMV hours | Storage | Public IP Addresses |
|---|---|---|---|---|
| Company quotas | 2/100 | 5/1000 | 40.0 GB/1000.0 GB | 0/5 |
| My quotas | 0/10 | 1/20 | 10.0 GB/100.0 GB | – |

©2009 Skytap, Inc.
Contact Us  License Agreement  Support

*FIG. 23*

*NOTE: This diagram combines both logical and physical design and thus is not an exact picture of the datacenter implementaiton High-level architecture of Multi-Tenant Hosted Virtual Machine Infrastructure A tenant's clustered network of virtual machines with customized hostnames, network addresses, and operating system types and associated storage pool constructed using MTVMI

FIG. 27

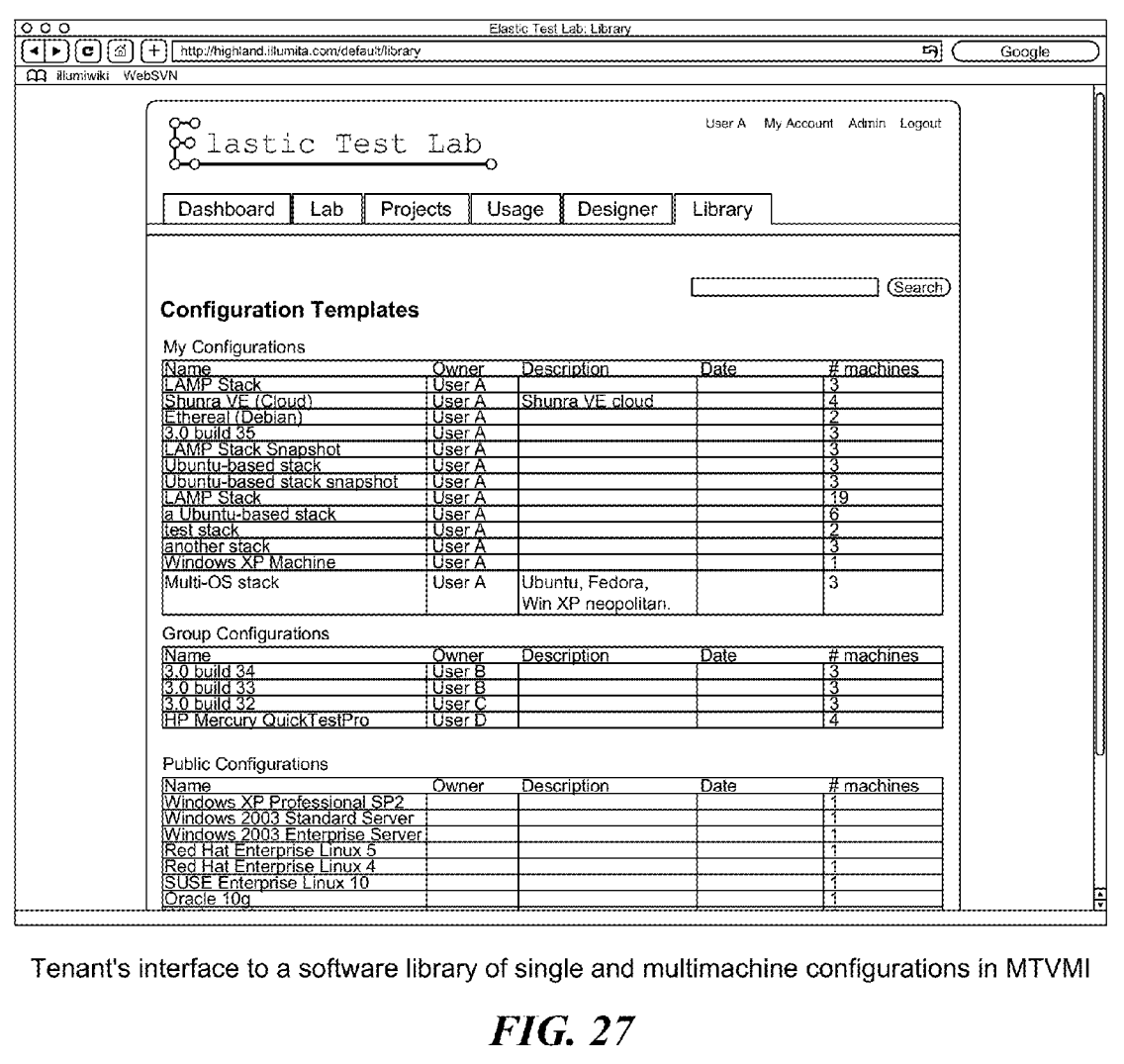

Tenant's interface to a software library of single and multimachine configurations in MTVMI

FIG. 28

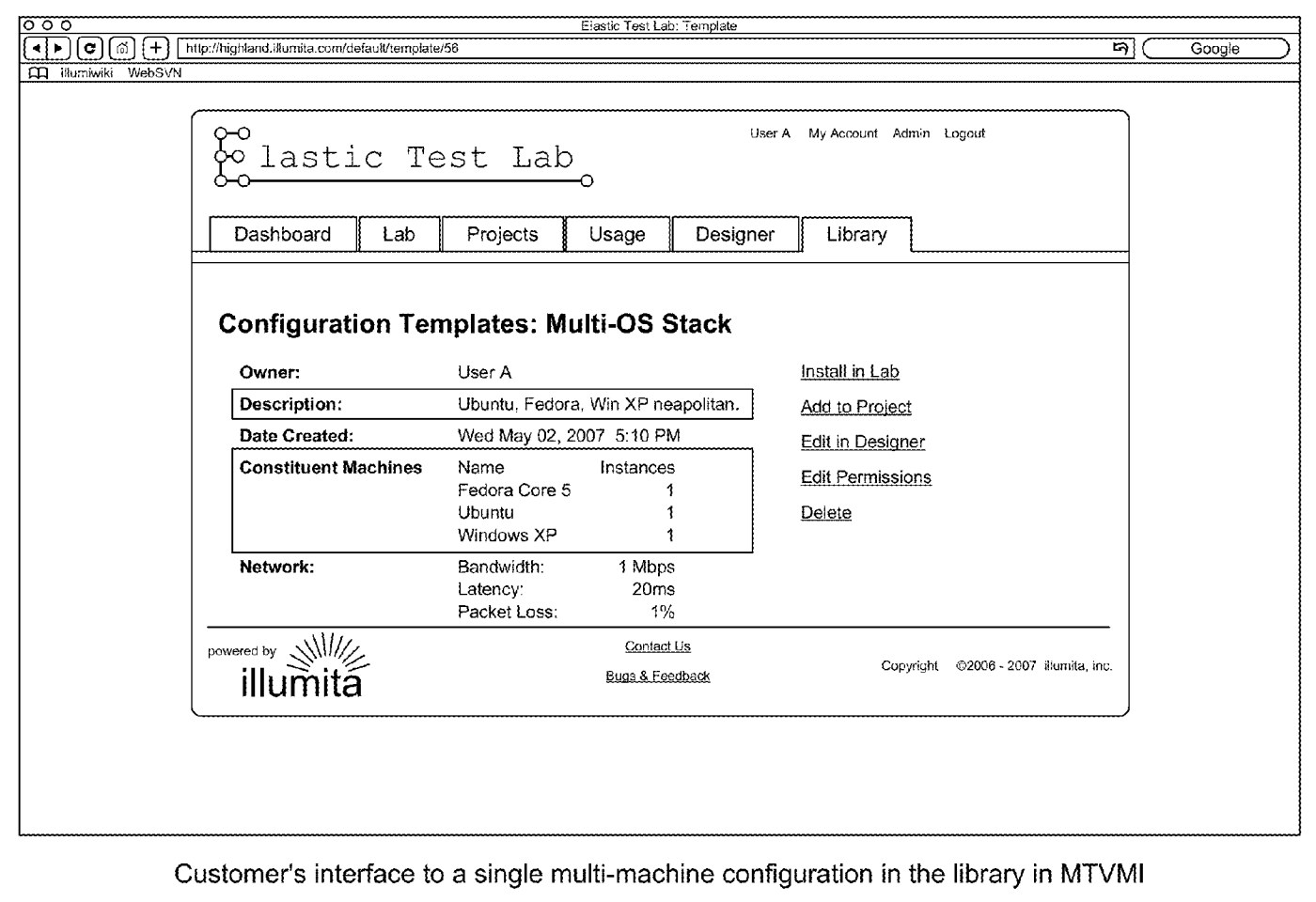

Customer's interface to a single multi-machine configuration in the library in MTVMI Tenant Interface for Monitoring Resource Usage in MTVMI

FIG. 30

Customer interface for configuring access permissions of their end-users to resources and configuration in MTVMI

| Dashboard | Projects | Lab | Library | Assets | Admin | Super | | |
|---|---|---|---|---|---|---|---|---|
| Customers | Users | Configurations | Monitoring | Auditing | Settings | | | |

Choose a customer: [All ▾]

Show activity: [All ▾]

Filter by: ⦿ users [All ▾]

or ○ projects: [All ▾]

between: [2008 ▾] [4 - April ▾] [30 ▾] [22 ▾] [21 ▾]

and: [2008 ▾] [5 - May ▾] [1 ▾] [22 ▾] [21 ▾] or ☐ now (Submit)

185 Results:
‹ Previous [1] [2] [3] [4] [5] [6] [7] Next ›

| Time | Customer | User | Project | Action | Configuration | VM Instances Affected | Affected Templates | Other Info |
|---|---|---|---|---|---|---|---|---|
| | illumita | Admin User | | Vnc session | Visual Studio 2008 on XP SP2 (configuration-80235) | XP SP2 with Visual Studio 2008 (session-802aa) | | Duration: Less than 1 minute |
| | illumita | Admin User | | Vnc session | nick-s vb6 machine -- DO NOT DELETE (configuration)-61abf) | nick's vb6 machine (session-61f32) | | Duration: Less than 1 minute |
| | illumita | Admin User | | Vnc session | dell console client (configuration-9c9aa) | Windows Server 2003 Standard R2 SP2 (session-9ca0d) | | Duration: Less than 1 minute |
| | Skytap Library | Super-User A | | Delete configuration | Windows Vista (Ultimate)_ (configuration-310aa) | Windows Vista – Ultimate (session-3f146) | | |
| | Skytap Library | Super-User A | | Create configuration | Windows Vista (Ultimate)_ (configuration-310aa) | Windows Vista – Ultimate (session-3f146) | Windows Vista (Ultimate) configuration-(0c9e5) | |

Super-user interface for auditing resource usage in MTVMI

*FIG. 32*

Skytap VIRTUAL LAB  Super-User A   My Account   Sign out
Dashboard | Projects | Lab | Library | Assets | Admin | Super  Help
Customers | Users | Configurations | Monitoring | Auditing
Settings

Customer 'Skytap Library'
Quotas

| Quotas | Maximum | Current Use | |
|---|---|---|---|
| storage | 40000.0 GB | 5305.3017578125 GB | X |
| Cpu cores | 4 | 2 | X |

©2008 Skytap, Inc.   Contact Us   License Agreement   Support

Interface for reviewing customer resource usage in MTVMI

*FIG. 33*

Active Hosting Nodes

| hpbl01-07.prod.illumita.com | | | | | Health status: green | Reset | Disable |
|---|---|---|---|---|---|---|---|
| dom0_cpus : 0 | hypervisor : vmware | | | last_session_assignment_time : 1209687804.20028 | | max_sessions : 7 | |
| num_cpus : 8 | num_sessions : 1 | | | parent_interface : | port : -1 | total_memory : 14.3 GB | |
| used_cpus : 1 | used_memory: 1 GB | | | vmware_hosting_manager : hpbl01-01.prod.illumita.com | | | |
| GUID | VM Name | Customer User | WFE | Mgmt Server DB | WFE Status | Mgmt Server Status (session, guestvm) | Hypervisor Status |
| session-6cfb4 | Windows XP Pro SP2 (English) | User A | ✓ | ✓ | running | deployed, running | powerState: poweredON overallStatus: green |

| hpbl01-08.prod.illumita.com | | | | | Health status: green | Reset | Disable |
|---|---|---|---|---|---|---|---|
| dom0_cpus : 0 | hypervisor : vmware | | | last_session_assignment_time : 1209705266.66917 | | max_sessions : 7 | |
| num_cpus : 8 | num_sessions : 4 | | | parent_interface : | port : -1 | total_memory : 14.3 GB | |
| used_cpus : 5 | used_memory: 5 GB | | | vmware_hosting_manager : hpbl01-01.prod.illumita.com | | | |
| GUID | VM Name | Customer User | WFE | Mgmt Server DB | WFE Status | Mgmt Server Status (session, guestvm) | Hypervisor Status |
| session-66123 | Empty 20 gb Image for Windows | Company A | ✓ | ✓ | running | deployed, running | powerState: poweredON overallStatus: green |
| session-da842 | Windows Server 2003 Enterpr... | Company B | ✓ | ✓ | running | deployed, running | powerState: poweredON overallStatus: green |
| session-9ca0d | Windows Server 2003 Standar... | Company C | ✓ | ✓ | running | deployed, running | powerState: poweredON overallStatus: green |
| session-8d4d2 | Windows Server 2003 Enterpr... | Company D | ✓ | ✓ | running | deployed, running | powerState: poweredON overallStatus: green |

| hpbl01-13.prod.illumita.com | | | | | Health status: green | Reset | Disable |
|---|---|---|---|---|---|---|---|
| dom0_cpus : 0 | hypervisor : vmware | | | last_session_assignment_time : 1209687055.00824 | | max_sessions : 7 | |
| num_cpus : 8 | num_sessions : 1 | | | parent_interface : | port : -1 | total_memory : 14.3 GB | |
| used_cpus : 1 | used_memory: 1 GB | | | vmware_hosting_manager : hpbl01-01.prod.illumita.com | | | |

*FIG. 34*

Interface for monitoring performance of virtual machine host nodes in MTVMI.

Skytap  VIRTUAL LAB

User A   My Account   Sign out   Help

| Dashboard | Projects | Lab | Library | Assets | Admin |

Edit Network Settings for 'Windows Vista - Ultimate'

← Return to Running Configuration

Hostname: [vis00001]
IP Address: [10.0.2.1]
MAC Address: [00:50:56:01:00:01]

(Save) or Cancel

Published Services

There are no currently published services.

Add a service on port: [80] (Add)

← Return to Running Configuration

©2008 Skytap, Inc.   Contact Us   License Agreement   Support

Interface for controlling virtual machine network settings in MTVMI.

*FIG. 35*

Skytap VIRTUAL LAB

User A   My Account   Sign out
                     ⓘ Help

| Dashboard | Projects | Lab | Library | Assets | Admin |

SkytapLibBuild
Created on:
Summary: (None)
Recent Activity: Date

- Suspend configuration performed by User A on Windows Vista (Business) with MS Office Enterprise 2007
- Run configuration performed by User A on Windows Vista (Business) with MS Office Enterprise 2007
  Date
- Vnc session performed by User B on Windows Vista (Ultimate)
- Vnc session performed by User C on Windows Vista (Ultimate)
- Poweroff configuration performed by User B on Windows Vista (Ultimate)

[Edit Users]

Configurations
*Add a configuration template to your project*

⊕ Add Configuration from library

Running Configurations

| Windows Vista (Business) ...MS Office Enterprise 2007 | Date | ✕ |
| joe/#999 - 28 apr 11am | Date | ✕ |
| Windows Vista (Ultimate) | Date | ✕ |

Interface for reviewing and modifying project settings in MTVMI.

*FIG. 36*

Skytap VIRTUAL LAB

User A    My Account    Sign out
                        ? Help

| Dashboard | Projects | Lab | Library | Assets | Admin |

My Project

| Project Name | Latest Activity |
|---|---|
| SkytapLibBuild | Create configuration performed by VarshaLib on Windows Vista (Business) |

View Projects >>

My Library

| Configuration | Created on |
|---|---|
| Windows Server 2003 Standard R2 SP2 | Date |
| Windows Vista (Ultimate) | Date |
| Windows Server 2003 Enterprise R2 SP2 (German) | Date |
| Ubuntu 7.10 (Gutsy Gibbon) | Date |
| CentOS 4.6 | Date |

Go to the Library >>

My Lab

Go to the Lab >>

| Quota | Usage | Limit |
|---|---|---|
| Storage | 5305.3 GB | 40000.0 GB |
| CPU cores | 2 | 4 |

Interactive Help
Upload an Asset >>
Upload an asset (test data, applications, ISOs, or anything else you might need to accomplish your tasks), and learn how to add them to a Virtual Machine.

Start and Snapshot a Configuration >>
Create a new Configuration, run it, and then Snapshot it to refer back to it later or to share it.

Published Services >>
Publish a service from a running Configuration, in order to access its functionality from the Internet. Common Published Services include Windows Remote Desktop Protocol (RDP) and HTTP.

Interactive Help for Administrators
Create a Project >>
Create users and a Project, add your users to the Project and set up a new VM configuration for the Project.

©2008 Skytap, Inc.    Contact Us    License Agreement    Support

Interface for facilitating user navigation within virtual lab service of MTVMI.

*FIG. 37*

Skytap VIRTUAL LAB

Super-User A  My Account  Sign out  Help

Dashboard | Projects | Lab | Library | Assets | Admin

[Users] [Projects] [Configurations] [Auditing] [Setup Wizard]

| Project Name | Latest Activity |
|---|---|
| Name A | User A |
| Name B | User B |
| Name C | User C |
| Name D | User D |
| Name E | User E |
| Name F | User F |
| Name G | User G |
| Name H | User H |
| Name I | User I |
| Name J | User J |

Create New Users

©2008 Skytap, Inc.  Contact Us  License Agreement  Support

Interface showing users associated with a tenant of MTVMI.

*FIG. 38*

| Skytap VIRTUAL LAB | | | | | Super-User A   My Account   Sign out   Help |
|---|---|---|---|---|---|
| Dashboard | Projects | Lab | Library | Assets | Admin |

| Configurations | Virtual Machines |
|---|---|

| | Name | Date | VMs |
|---|---|---|---|
| Category: | Windows XP Pro SP2 (German) | Date | |
| → All Categories | Windows Server 2003 Standard (German) | Date | |
| Favorites | Windows XP Pro SP2 (German) | · | |
| My Configurations | Windows Server 2003 Enterprise R2 SP2 (German) | · | |
| Project Configurations | Windows Server 2003 Enterprise (German) | · | |
| Public Configurations | Windows Server 2003 Enterprise SP1 (German) | | |
| Vendor: | Windows Server 2003 Enterprise R2 SP2 (German) | | |
| → All Vendors | Windows Server 2003 Standard (German) | | |
| Microsoft | Windows Server 2003 Standard (German) | | |
| CentOS | Windows Server 2003 Enterprise R2 SP2 (German) | | |
| Ubuntu | Windows Server 2003 Enterprise SP1 (German) | | |
| Language: | Windows Server 2003 Enterprise (German) | | |
| → All Languages | Windows Server 2003 Enterprise R2 SP2 (German) | | |
| English | | | |
| German | | | |
| Japanese | | | |
| Spanish | | | |
| French | | | |
| Clear filters | | | |

*Select an item from the Library.*

©2008 Skytap, Inc.   Contact Us   License Agreement   Support

Interface for facilitating user navigation within virtual lab service of MTVMI.

Figure 40:
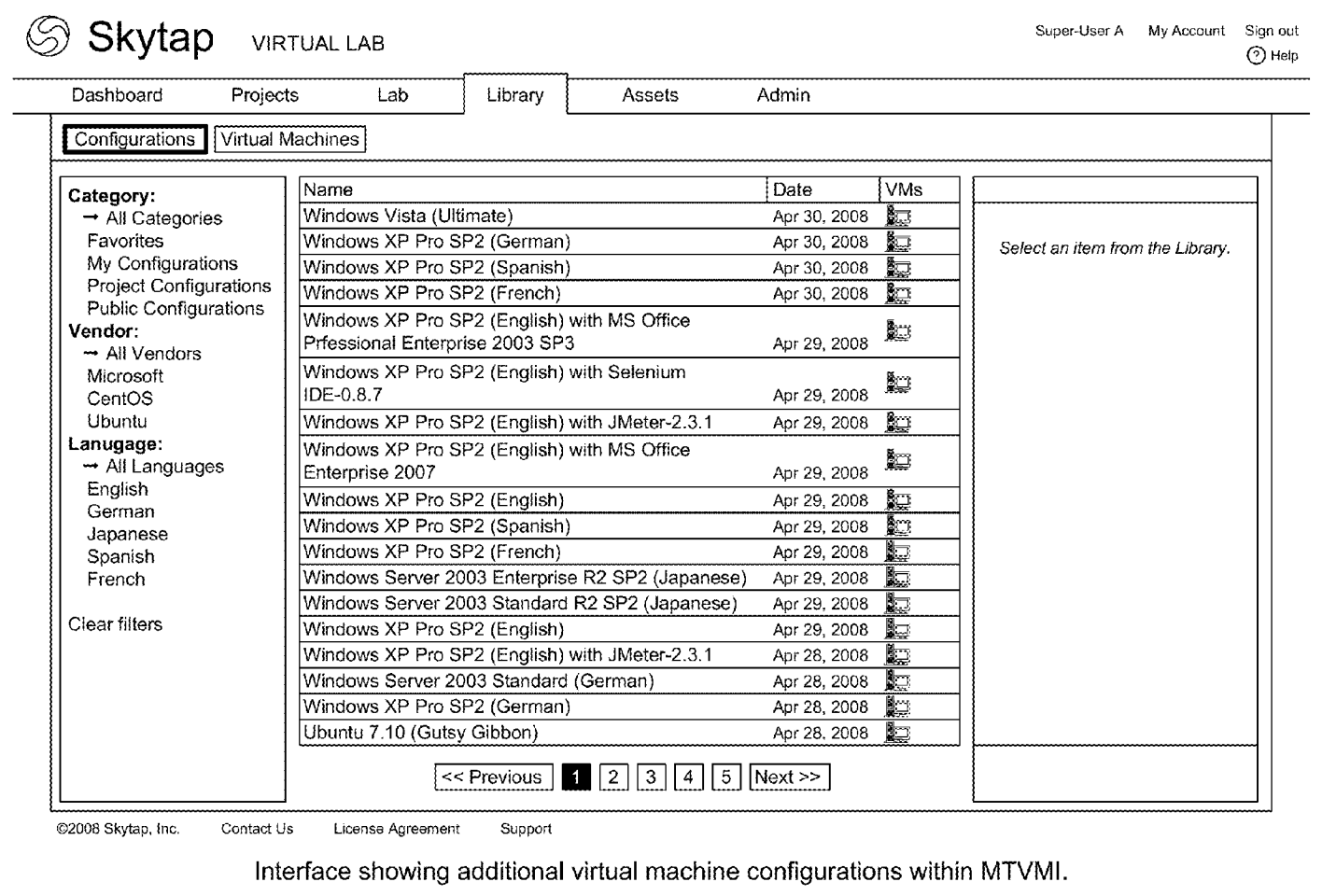

Interface showing additional virtual machine configurations within MTVMI.

Super-user interface showing customers of MTVMI.

Skytap VIRTUAL LAB

Super-User A   My Account   Sign out
                              (?) Help

Dashboard | Projects | Lab | Library | Assets | Admin | Super

Customers | Users | Configurations | Monitoring | Auditing | Settings

| Customer | Last name | First name | Customer |
|---|---|---|---|
| aaron | Brethorst | Aaron | illumita |
| admin | User | Admin | illumita |
| aldof | Fernandez | Ronaldo | illumita |
| alex | Burreson | Alex | Skytap Sales |
| andrus-library | andrus | ross | Skytap Library |
| arlene | Wesley | Arlene | Pacific Retail |
| bhuttvdi | Hutt | Barry | Company A |
| CCTSales | Sales | CCT | Company A |
| dnyan | Mankulwar | Dnyanesh | Company B |
| dnyanm | | Dnyan M | Company B |
| hanlon | Hanlon | Matt | illumita |
| iank | Knox | Ian | illumita |
| isolib | Librarian | ISO | Skytap Library |
| isouser | | Isouser | illumita |
| jcallisonluxoft | Callison | Justin | Company C |
| joe | Goldberg | Joe | illumita |
| johnj | Janakiraman | John | illumita |
| johnjlib | janakiraman | John | Skytap Library |

1 2 3   Next page

Create New User

©2008 Skytap, Inc.   Contact Us   License Agreement   Support

Super-user interface showing users associated with customers of MTVMI.

Interface showing current configuration of MTVMI.

Interface for authenticating user or tenant software license within MTVMI.

Interface for authenticating user or tenant software license within MTVMI.

| | | 4700 |
|---|---|---| new vendor profile

- company name: HyperTools — 4701
- company address: 11 E. Main St. Zora, PA 17320 — 4702
- contact name: Denise Arnold — 4703
- contact email: DA@H-Tools.com — 4704
- contact phone: 717-934-1212 — 4705
- access password: **** — 4706

Submit — 4710

```
┌─────────────────────────────────────────────────────────────── 4800
│          ┌─────────────────────────────────────────┐
│          │  list content for consumption on marketplace │
│          └─────────────────────────────────────────┘
│
│   vendor        HyperTools  ╱─4801
│                 4811 ─╲
│   name          ┌──────────────────────────────────┐
│                 │ Crossbow Debugger                │
│                 4812 ─╲
│   description   ┌──────────────────────────────────┐
│                 │ A robust debugging environment; received four │
│                 │ start review from Developer's Journal         │
│                 4813 ─╲
│   support link  ┌──────────────────────────────────┐
│                 │ www.h-tools.com/support/cb.htm   │
│                 4814 ─╲
│   listing expiration date  ┌──────────┐
│                            │ 1/1/2012 │
│                            └──────────┘
│   pricing:
│                                                    4821
│      monthly subscription    $ ┌─────┐ /mo/user
│                                │ 25  │          4822
│      annual subscription     $ ┌─────┐ /yr/user
│                                │ 200 │          4823
│      hourly metered          $ ┌─────┐ /hr
│                                │ .05 │          4824
│      permanent license       $ ┌─────┐ /user
│                                └─────┘
│                                              ╱─4831   ╱─4832
│      file to upload   ┌────────────────────┐ ┌────────┐
│                       │ c:\bin\cb.exe      │ │ Browse │
│                       └────────────────────┘ └────────┘
│                                    ┌────────┐ ╱─4840
│                                    │ Submit │
│                                    └────────┘
└───────────────────────────────────────────────────────────────
```

*FIG. 48* vendor accounting results for /—4901
4902 —\ ←  February, 2009  → —4903

| item /—4911 | rate /—4912 | units /—4913 | revenue /—4914 | item total /—4915 |
|---|---|---|---|---|
| crossbow debugger | $25/mo/user | 22 | $550 | |
| | $200/yr/user | 4 | $800 | |
| | $.05/hr | 7200 | $360 | $1710 |
| image cropper | $5/yr/user | 75 | $375 | |
| | $10/user | 230 | $2300 | $2675 |
| | 4940 —\ gross revenue for month | | | $4385 |
| | 4950 —\ marketplace charge | | | ($877) |
| | 4960 —\ net revenue for month | | | $3508 |

4920 { (brace for first three rows)
4930 { (brace for image cropper rows)

*FIG. 49*

Customer Table 5201

| Customer ID | Customer Attributes |
|---|---|
| | (includes Customer Quota ID) |
| | |

User Table 5202

| User ID | User Attributes |
|---|---|
| | (includes Customer ID, User Quota ID) |
| | |

Project Table 5203

| Project ID | Project Attributes |
|---|---|
| | (includes Customer ID, Project Quota ID) |
| | |

Role Assignment Table 5204

| User ID | Project ID | User Role |
|---|---|---|
| | | |
| | | |

Shares Table 5205

| Object ID | Owner ID | Customer ID | List of Project IDs Shared With |
|---|---|---|---|
| (e.g., Virtual Data Center Configuration ID etc.) | | | |
| | | | |

*FIG. 52*

Customer Table 5301

| Customer ID | Customer Attributes |
|---|---|
| | (includes Customer Quota ID) |
| | |

User Table 5302

| User ID | User Attributes |
|---|---|
| | (includes Customer ID, User Quota ID) |
| | |

Project Table 5303

| Project ID | Project Attributes |
|---|---|
| | (includes Customer ID, Project Quota ID) |
| | |

Resource Usage Events Table 5304

| Event ID | Resource Type | Resource Size | Start Time | End Time | Object ID | List of Quota IDs |
|---|---|---|---|---|---|---|
| | | | | | | |
| | | | | | | |

*FIG. 53*

METHOD, MEDIUM, AND SYSTEM FOR MULTITENANT HOSTED VIRTUAL MACHINE INFRASTRUCTURE

CROSS-REFERENCE TO RELATED APPLICATION(S)

This application is a divisional application of U.S. application Ser. No. 12/434,621, filed May 2, 2009, entitled MULTITENANT HOSTED VIRTUAL MACHINE INFRASTRUCTURE, which claims the benefit of each of U.S. Provisional Patent Application No. 61/050,163, filed on May 2, 2008, and U.S. Provisional Patent Application No. 61/101,665, filed on Sep. 30, 2008, each of which is hereby incorporated by reference in its entirety.

This application is related to and incorporates in their entirety U.S. Non-Provisional Application entitled MULTITENANT HOSTED VIRTUAL MACHINE INFRASTRUCTURE filed concurrently herewith, U.S. application Ser. No. 13/276,153, filed Oct. 18, 2011, U.S. application Ser. No. 13/619,959, filed Sep. 14, 2012, U.S. application Ser. No. 12/434,619, filed May 2, 2009, U.S. application Ser. No. 12/434,620, filed May 2, 2009, and U.S. application Ser. No. 12/434,621, filed May 2, 2009, each of which is hereby incorporated by reference in its entirety.

BACKGROUND

A virtual machine is a software construct designed to run computer programs like a real physical machine. As an example, a virtual machine may comprise various software components for running executable code written for a particular computing platform. Such executable code may include, among other things, operating system code, application programs, software drivers, and so on.

A virtual machine does not necessarily have a direct correspondence to a real physical machine; however, virtual machines are often designed to imitate the behavior of specific hardware architectures. As an example, a virtual machine may be designed to imitate the behavior of an x86 processor.

Virtual machine infrastructures (VMIs) have been developed to coordinate user access to collections of virtual machines and to provide additional features such as virtual networking capability, virtual data storage management, and so forth. In general, a VMI comprises a set of physical computational resources, virtualization software for creating virtual machines on the physical computational resources, and management software for managing the virtual machines and coordinating access to the virtual machines.

In one example, a VMI comprises a set of physical computers each running multiple virtual machines. Users at separate remote-access consoles access the different virtual machines over a local area network. Each console includes a virtual machine interface designed to allow a user to interact with a virtual machine in the same way that the user would interact with a local machine. For instance, the virtual machine interface may present a user desktop and explorer windows similar to those found in an ordinary personal computer.

Within a VMI, different virtual machines may be individually configured according to the users' unique needs and preferences. For instance, the different virtual machines may run different types of operating systems (e.g., Windows, Linux), allowing the users to use different operating-system-specific programs within the VMI. Additionally, each of the virtual machines may provide a different level of performance so that the resources of the single physical computer can be efficiently divided among users having different computational demands.

Recently, large enterprises have begun employing complex VMIs to provide virtual computing resources for large groups of users. These users may work together, but have different computational demands. As an example, a company with hundreds of employees may set up a virtual data center comprising many physical machines each configured to run several virtual machines for use by the employees.

The virtual machines can be configured in accordance with the different computational demands and preferences of the different employees. For instance, an employee whose job requires a significant amount of computing power—say, an engineer who runs test simulations on complex circuits—may use a virtual machine configured with higher throughput and more memory, compared with an employee whose job only requires the use of a few simple programs such as a word processor and an Internet browser. Similarly, an employee whose job requires a relatively high level of system access—say, a system administrator—may use a virtual machine configured with a higher level of access within the VMI compared with an employee whose job requires a relatively lower level of access.

Conventional VMIs are designed for use within a single organization, i.e., a single company or group of users. In this type of VMI, the operation of the virtual machines is governed by a common set of rules, such as a common hierarchy of access rights, usage rights, quality of service guarantees, and naming conventions. Additionally, in this type of VMI, the configuration of resources is controlled by a single administrative entity, i.e., a single system administrator or group of system administrators.

BRIEF DESCRIPTION OF THE DRAWINGS

FIG. 9-25 are display diagrams showing a typical user interface presented by an example software application running on a MTVMI to provide a virtual lab service in some embodiments.

FIGS. 25-26 show additional conceptual diagrams illustrating the organization of the MTVMI in some embodiments.

FIGS. 27-46 are display diagrams showing displays presented by the MTVMI in some embodiments.

FIGS. 47-49 show a user interface designed for use by vendors offering items for sale via the marketplace.

FIG. 52 is a block diagram illustrating the organization of the data model that supports access control mechanisms of MTVMI management application in some embodiments.

FIG. 53 is a block diagram illustrating the organization of the data model that supports resource usage quota mechanisms of MTVMI management application in some embodiments.

DETAILED DESCRIPTION

Figure 1:
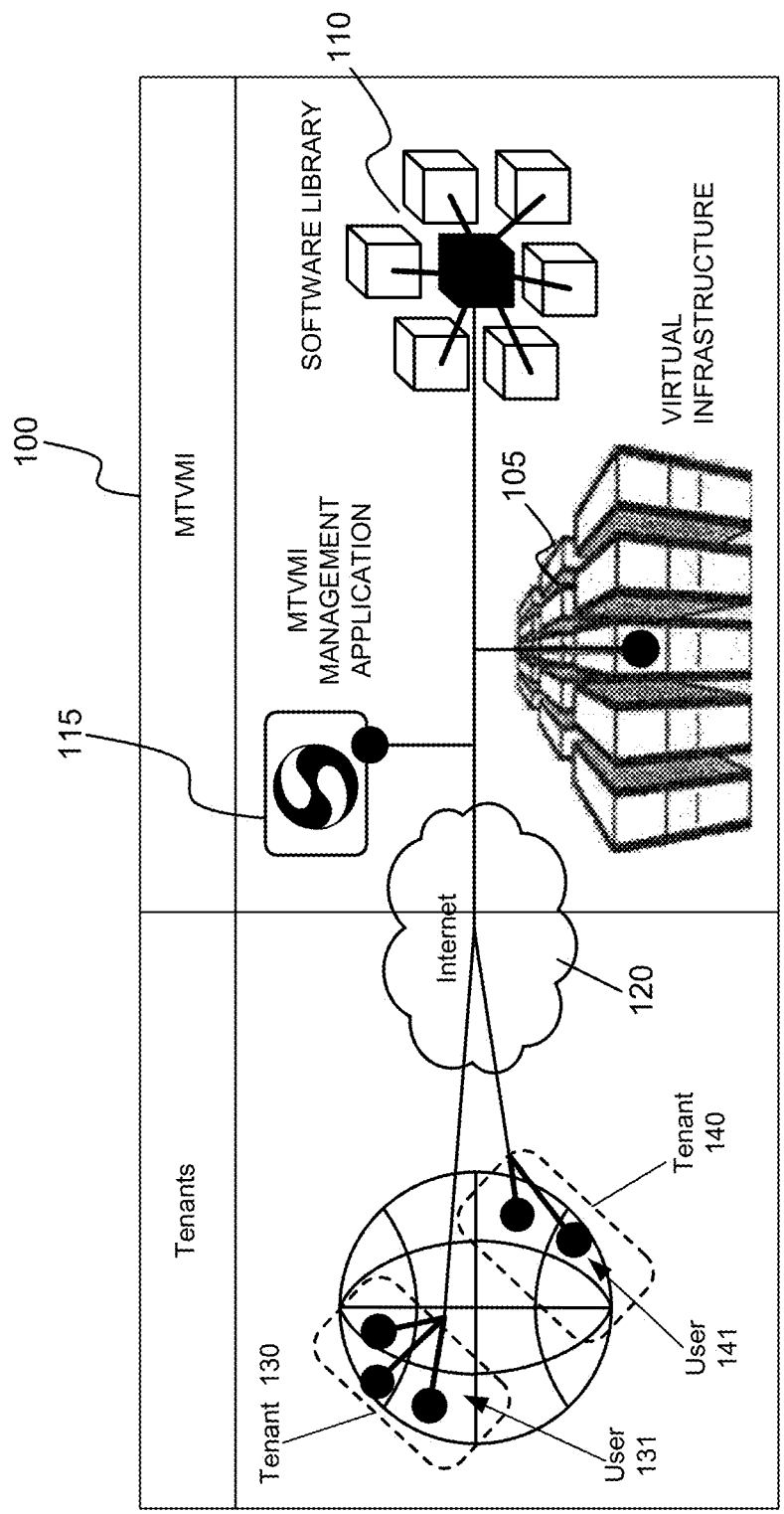
FIG. 1 is a conceptual diagram providing a system-level overview of a hosted multitenant virtual machine infrastructure (MTVMI) in accordance with in some embodiments.

A variety of embodiments will now be described. These embodiments are provided as teaching examples and should not be interpreted to limit the scope of the invention. Although specific details of the embodiments are presented, these embodiments may be modified by changing, supplementing, or eliminating many of these details.

A shared computing infrastructure ("the infrastructure") is described. In some embodiments, a user can exploit the entire infrastructure using a standard web browser, without having to install any specialized applications. The infrastructure supports the deployment of virtual data centers, wherein each cluster comprises one or more virtual machines capable of transparently interfacing with computing resources located elsewhere in the Internet. As an example, the infrastructure may execute a virtual machine cluster on physical machines within the infrastructure, while users control the virtual machines through personal computers connected to the infrastructure via the Internet.

The shared computing infrastructure may incorporate a software environment and interface capable of facilitating the automation of specific virtualized infrastructure based services. As an example, the infrastructure may incorporate a software platform that implements a portal where users can develop and exchange data that may be useful within the infrastructure. This data could include, e.g., virtual network configurations and software applications that could be run within the virtual infrastructure. The data could be developed by individual users or by group collaboration within the infrastructure. Additionally, the data could be exchanged with or without monetary payments.

For explanation purposes, the shared computing infrastructure will be referred to as a multi-tenant virtual machine infrastructure (MTVMI). A MTVMI is a VMI adapted for use by multiple tenants, where each "tenant" is an independent entity (e.g., a set of users within a single company or other organization) whose access to and use of the MTVMI is governed by a unique and independent set of rules. For instance, each tenant in a MTVMI may have a unique and independent authentication mechanism, access control model, hierarchy of rights and privileges, resource allocation control model, resource usage control, quotas, service level agreements, and billing.

Although the term "tenant" generally has a connotation related to the rental or occupation of property or space, "tenant" in the current context should not be limited to entities having certain legal or logistical agreements or arrangements relative to the MTVMI; neither should it be limited to entities who occupy a certain quantity of space or resources within a MTVMI. Rather, "tenant" here merely refers to any entity having a certain logical relationship with the MTVMI as demonstrated by the examples and explanations presented in this written description.

Examples of multiple tenants sharing a MTVMI include different companies or groups of individual users. For instance, an MTVMI could be shared by multiple large corporations each having its own cluster of virtual machines, its own virtual storage management system, and so on.

FIG. 1 is a conceptual diagram providing a system-level overview of a hosted MTVMI 100 in accordance with an embodiment of the invention. As seen in FIG. 1, MTVMI 100 comprises a physical infrastructure resident at the MTVMI provider's site, virtual infrastructure 105, a software library 110, and a MTVMI management application 115.

The left side of FIG. 1 shows different tenants 130 and 140 connected to MTVMI 100 through the Internet 120. Different users among tenants 130 and 140 may access MTVMI 100 over corresponding secure Internet connections. Typically, a user accesses MTVMI 100 by logging on to the infrastructure through an Internet browser. Once the user logs on to MTVMI 100, a user interface for MTVMI 100 appears in the user's computer display to allow the user to access various features of MTVMI 100. In some embodiments, the user interface appears similar to a normal computer desktop, so that the user's experience is substantially the same as it would be if the user was interacting with a set of local resources. The user interface enables a user associated with a tenant to manage virtual machines, such as by creating, configuring, starting, and stopping virtual machines.

In general, tenants can access MTVMI 100 over the Internet from any Internet-enabled device. As examples, the MTVMI can be accessed through personal computers, Internet-enabled personal digital assistants (PDAs), and Internet-enabled cell phones. In some embodiments, where a user accesses the MTVMI 100 using a portable device such as a PDA or cell phone, the user does so with a web browser installed in the device, much like the user would do in a personal computer.

Each tenant of MTVMI 100 operates within its own unique virtual environment. The environment for each tenant may include, for example, one or more unique virtual data centers each comprising a set of virtual machines, virtual storage, and virtual network accessible to the tenant's users. The environment may further include methods for managing the cluster, such as a hierarchy of user access rights, limits on the amount of central processing unit (CPU) time and storage space available to the users, and so on. Additionally, the environment for each tenant may provide the tenant's users with access to specific software applications found in software library 110, as well as one or more labs 112 corresponding to instantiated virtual data centers that can be executed.

Within MTVMI 100, virtual infrastructure 105 comprises both a physical platform for running virtual machines, virtual storage, and virtual network, and a software platform enabling the creation and management of the virtual machines, virtual storage, and virtual network. The physical platform may comprise computer hardware such as storage system and media, servers comprising CPUs, memory, and related processing components, and networking hardware such as network switches, routers, etc. The software platform may include, e.g., a hypervisor for each server, and software components for the storage system and networking components and software for managing them.

Within virtual infrastructure 105, different functional components can be roughly partitioned into three groups, including network nodes, virtual machine host nodes, and storage nodes. Network nodes include both hardware and software components for implementing virtual network functionality, virtual machine nodes include hardware and software components for creating and hosting virtual machines, and storage nodes include hardware and software components for implementing virtual data storage.

The composition and operation of example network nodes, virtual machine host nodes, and storage nodes is explained further below with reference to FIG. 6. Although the description treats these different nodes as separate features, it should be recognized that the functionality of these nodes can be implemented by different hardware and software arrangements. Moreover, the functionality of the different nodes will not necessarily be implemented within different physical or logical structures. In other words, some components may implement functions for more than one type of node.

Software library 110 comprises a collection of software programs, data objects, and/or virtual data center configurations for use by different tenants of MTVMI 100. The software programs may include, among other things, specific operating systems to be run on virtual machines, application programs to run within the virtual machines, and any code used by tenants to maintain their own virtual resources. The data objects may include, for example, database files, software configuration files, and so forth. The virtual data center configurations may include, e.g., specifications of network topologies, and hardware and software specifications for individual virtual machines within virtual networks. One example configuration for a virtual machine could include 2 GHz virtual CPU and 1 GB RAM, and run Windows XP.

Some of the programs and data in software library 110 may be commercial software requiring individual or corporate user-licenses. The licensing of these programs or data may be regulated in any of several different ways. As examples, tenants or individual users could provide their own license keys for the programs, or licenses could be provided as part of a tenant's agreement for using the MTVMI. In some embodiments, MTVMI 100 includes mechanisms for automatically negotiating the licenses with third party software providers in real time. In some embodiments, licenses are purchased by the entity hosting the MTVMI 100 so that users are not required to obtain their own licenses.

In some embodiments, software library 110 is divided into public and private libraries. A public library is a portion of software library 110 accessible to any tenant using MTVMI 100. A private library, on the other hand, is a portion of software library 110 accessible to only a subset of the tenants using MTVMI 100 or to a subset of users belonging to a tenant. Public libraries may include, for instance, freeware software applications, commercial operating systems and applications that can be provided to tenants for a charge based on usage, shared data, and so on. Private libraries may include, for instance, licensed or proprietary software for use by individual tenants, specific data objects related to work performed by the tenant or the configuration of a tenant's virtual network. In some embodiments, a library can contain a commercial operating system, application, or other program that, when installed on a virtual machine, will be customized with a license key owned by the installing tenant.

In addition to specific software programs and data structures, software library 110 may further include specific virtual data center configurations for use by individual tenants. A virtual data center configuration stored in the software library contains complete information for instantiating a set, or "cluster" of virtual machines connected by a virtual network. The virtual data center configuration specifies capabilities of each virtual machine to be instantiated in the cluster, including such attributes as number of processor cores, amount of memory, operating system for which the virtual machine is to be optimized, etc. The virtual data center configuration further contains complete state for each virtual machine to be instantiated. Such state generally includes contents of a disk volume to be accessible by the virtual machine, and may also include memory contents of the virtual machine, and/or processor status for the virtual machine, including contents for registers including program counters. In some embodiments, a user may upload a virtual machine image generated outside the MTVMI. This virtual machine image can be stored in the library, and instantiated by the MTVMI in a lab.

Each of the labs 112 is an instance of a virtual data center created by a tenant's user using the content in the software library. As an example, one virtual data center may include several virtual machines with a particular operating system and particular applications, as well as virtual storage, that is together performing a batch application. The labs for a tenant may consist of any number of such configuration instances, which can be in varying states, including running and stopped.

Further descriptions of software libraries and labs are provided below with reference to FIGS. 11-20. Various additional functions and benefits of software library 110 will be readily apparent from the descriptions of FIGS. 11-20. MTVMI management application 115 controls and monitors interactions between tenants and MTVMI 100. Additionally, MTVMI management application 115 allocates resources among different tenants and coordinates the use of MTVMI 100 by the different tenants. Various management related tasks performed by MTVMI management application 115 may include, as examples, authenticating users, allocating CPU time and storage space among different tenants, maintaining logical isolation between different tenants, tracking each tenant's usage of MTVMI 100, and many others. Additional examples of specific functions that can be performed by MTVMI management application 115 are described below in relation to FIG. 6.

Tenant information such as virtual data center configurations and stored data within MTVMI 100 may be generated in a variety of different ways. For instance, in some embodiments, the tenant information may be generated by a tenant's privileged user through manual operations on the MTVMI 100 using its graphical interface. Alternatively, virtual data center configurations and other tenant information can be generated for MTVMI 100 by providing a machine container that describes an existing physical or virtual machine or cluster to a module within MTVMI 100, and operating the module to generate a virtual data center configuration for use within MTVMI 100. Moreover, virtual data storage facilities can be established and initialized within MTVMI 100 by downloading data from an existing data storage platform into MTVMI 100.

Figure 2:
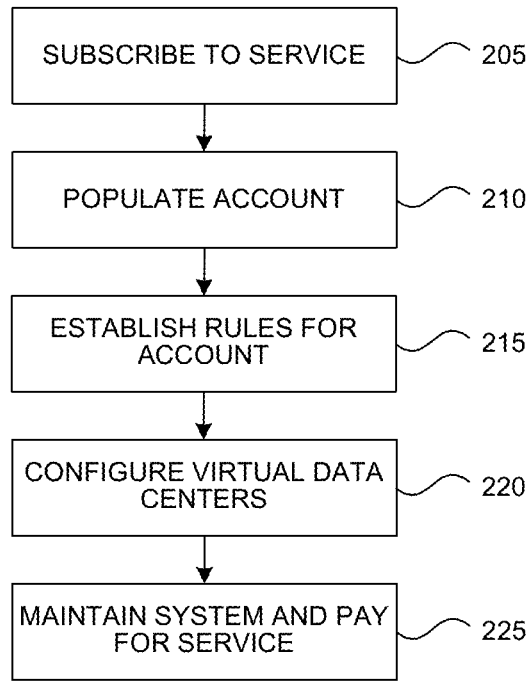
FIG. 2 is a flowchart illustrating the use of a MTVMI by a new tenant in some embodiments.

FIG. 2 is a flowchart illustrating the use of a MTVMI by a new tenant in some embodiments. FIG. 2 is intended to provide a very broad illustration of the tenant's interactions with the MTVMI, beginning with the initial establishment of a usage agreement between the tenant and an MTVMI host. In the description that follows, it can be assumed that actions performed by the tenant are actually carried out by a representative of the tenant, such as a system administrator or another authorized individual.

Referring to FIG. 2, in step 205, a tenant establishes a relationship with a MTVMI host by submitting a subscription request to the host. In the subscription request, the tenant may specify, among other things, a desired amount of resource usage within the MTVMI, any desired features such as access to particular software applications, and other terms for governing tenant's use of the MTVMI. A tenant's resource usage can be measured in any of several different ways, including, e.g., by a total amount of CPU time used by the tenant, or by a total amount of time that users are logged on to the MTVMI.

Once a tenant has subscribed to use the MTVMI, the tenant may establish its own virtual data center within the MTVMI. The tenant's virtual data center may include, among other things, a set of virtual machines, a set of virtual networks, and a set of data storage resources. The performance and capacity of the tenant's virtual data center may be limited by the tenant's subscription agreement; however, the tenant is generally free to configure the logical structure of the data center in any way desired. At a high level, the tenant's process of establishing a virtual data center may be compared, by analogy, to the process that an organization goes through to establish a physical data center, by purchasing a set of physical resources, connecting the resources together, and getting the resources to communicate with one another. However, in contrast to a physical data center, a virtual data center requires significantly less legwork on the part of the system architects, and therefore tends to require much less time and expense.

As part of establishing the virtual data center, in step 210, the tenant establishes rules to govern use of the virtual data center. Examples of these rules include, among others, a hierarchy of access rights and software license privileges for different users, constraints on network topology or evolution, and limits on the amount of computational bandwidth and storage space allocated to different users. The access rights, in addition to limiting use of certain resources by certain users, may also limit the ability of certain users to change aspects of the virtual data center, e.g., by adding additional machines, and so forth. In many regards, the rules governing the virtual data center can be established so they are similar to the rules that govern ordinary, physical data centers in most organizations. The MTVMI provides the environment and tools for the tenant's user to establish these governance rules.

Once rules have been established for the virtual data center, in step 215, individual resources of the data center are configured. For instance, certain software can be associated with certain virtual machines, certain users can be assigned as the primary users for particular machines, and so on. In this regard, step 215 is similar to the process of installing software and setting up user-accounts in a normal non-virtual data center.

Once resources have been configured for the virtual data center, in step 220, the tenant may continue to perform maintenance and monitoring on its virtual data center while the virtual data center is being used by the tenant's users. The maintenance and monitoring may include upgrading and patching various components, modifying the set of users associated with the tenant, measuring the resource usage by different users, and so on.

Those skilled in the art will appreciate that the steps shown in FIG. 2 and in each of the flow charts discussed below may be altered in a variety of ways. For example, the order of the steps may be rearranged; some steps may be performed in parallel; shown steps may be omitted, or other steps may be included; etc.

Figure 3A:
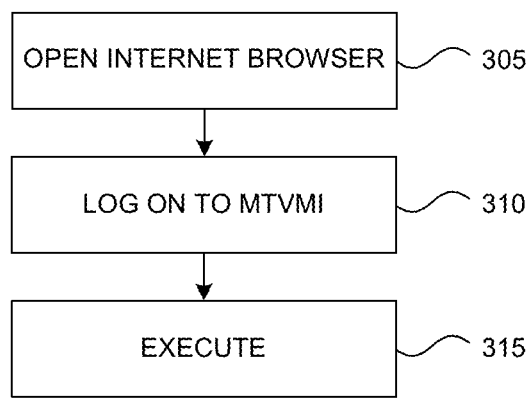
FIG. 3A is a flowchart illustrating the use of a MTVMI by a user associated with a particular tenant in some embodiments.

FIG. 3A is a flowchart illustrating the use of a MTVMI by a user associated with a particular tenant in some embodiments. To use the MTVMI, in step 305, the user opens an Internet browser. As explained above, the Internet browser may be included in any type of web-enabled device, including, e.g., a personal computer, a web-enabled cell phone, or a PDA.

After opening the Internet browser, the user enters a URL for the MTVMI to load an MTVMI access portal website into the browser. In step 310, the user logs onto the MTVMI through the access portal by supplying credentials such as a user name and password to the portal.

After the user logs onto the MTVMI, the user has access to the software library, labs, and data store. The lab can have multiple configuration instances, each of which can have multiple virtual machines. The display of the user's machine may be modified to show a desktop for any instantiated virtual machine in the labs. The desktop may resemble an ordinary computer desktop as is normally displayed on a personal computer. As a result, the user may interact with the virtual machine in essentially the same way that the user would interact with a local machine.

Figure 3B:
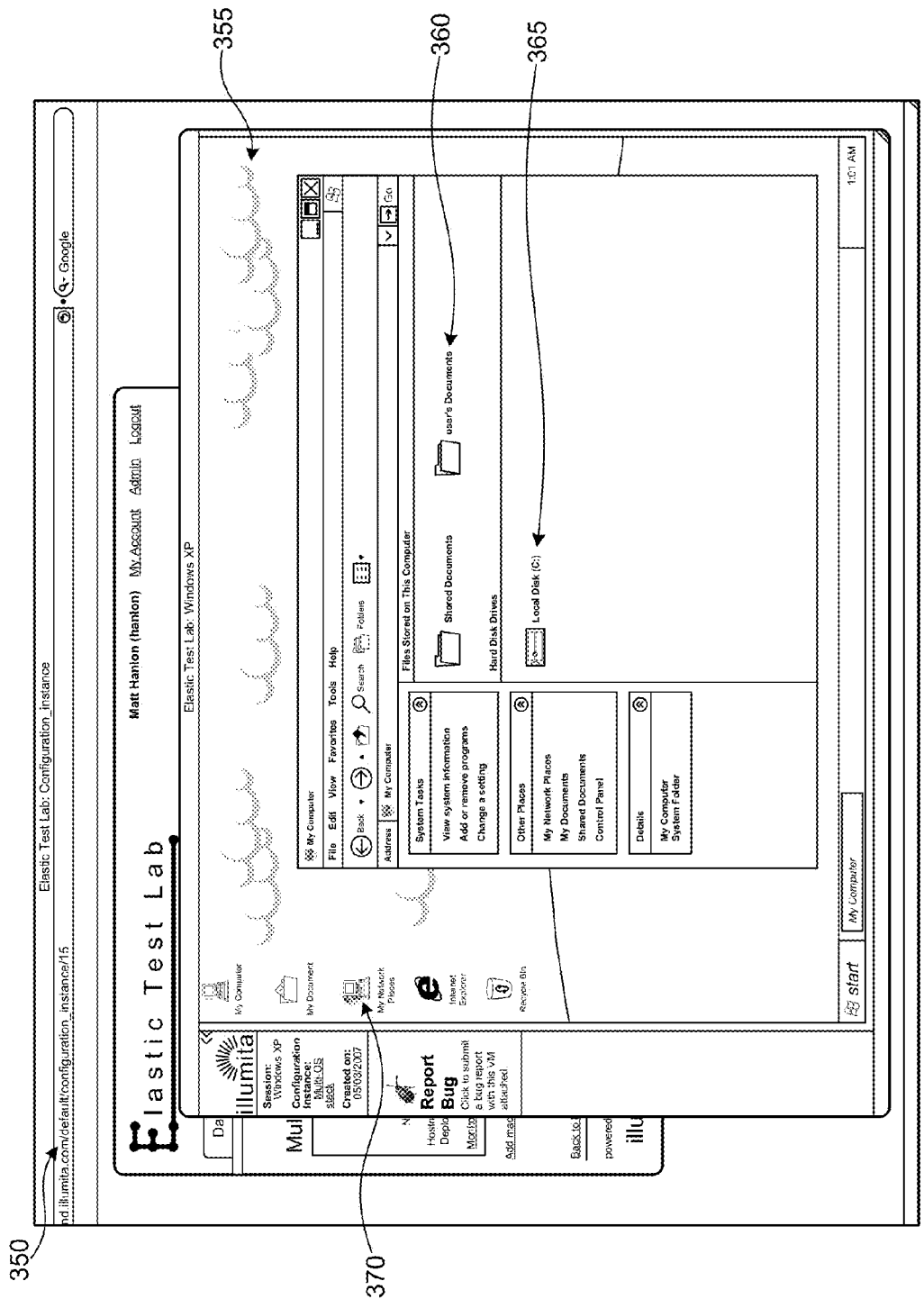
FIG. 3B is a display diagram showing an example browser that could be used to log into a MTVMI, and a resulting screen that may appear in the user's display upon logging in to the MTVMI in some embodiments.

FIG. 3B is a display diagram showing an example browser 350 that could be used to log into a MTVMI, and a resulting screen 355 that may appear in the user's display upon logging in to the MTVMI. As seen in FIG. 3B, the user may have access to a virtual local disk 365, and documents 360 stored in a virtual storage platform. In addition to local disk 365, the user may also have access to other virtual machines within a virtual data center created by the tenant. In one embodiment, these additional virtual machines may be accessible through an icon such as the "My Network Places" icon 370 displayed on the screen 355.

Once the user is logged onto the MTVMI, the user may interact with the virtual machine in much the same way that the user would interact with a non-virtual local machine. In addition, as will be described in greater detail with reference to FIGS. 7-22, a user who has logged onto the MTVMI may also perform actions such as creating a lab with multiple virtual machines, and installing custom software applications on the different virtual machines for specific tasks.

Figure 4:
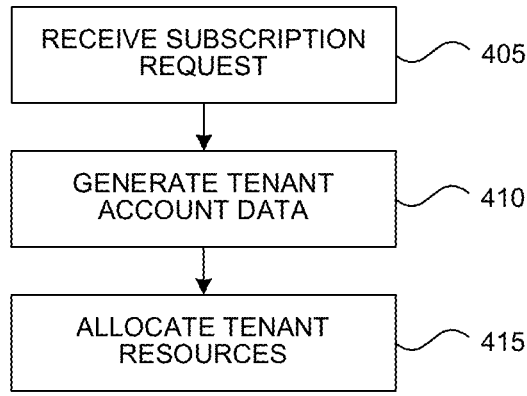
FIG. 4 is a flowchart illustrating the operation of a MTVMI in relation to a tenant in some embodiments.

FIG. 4 is a flowchart illustrating a method of operating a MTVMI in relation to a tenant in some embodiments. The method of FIG. 4 can be viewed as a counterpart to the method illustrated in FIG. 2. In other words, while FIG. 2 illustrates actions performed by a tenant in relation to the MTVMI, FIG. 4 shows actions performed by the MTVMI in relation to a tenant. In general, the actions of the MTVMI may be performed by a MTVMI management application such as that illustrated in FIGS. 1 and 6.

Referring to FIG. 4, in step 405, the MTVMI receives a subscription request from a new tenant. As described above in relation to FIG. 2, the subscription request may include, among other things, information specifying desired usage rights for the new tenant. In step 410, the MTVMI generates account data for the new tenant based on the information provided with the subscription request. The account data may include, e.g., information for regulating MTVMI access and usage by the tenant, such as a data storage quota, authorized users associated with the tenant, a CPU quota, network bandwidth quota, and user authentication information.

After the account data is generated, in step 415, the MTVMI allocates tenant resources, such as data storage space, CPU time, and so forth. In some embodiments, these resources are allocated on an on-demand basis. In other words, resources such as storage space and CPU time are only allotted to a tenant when the tenant, performs an operation requiring the resources. In other embodiments, however, resources may be reserved for use by individual tenants, regardless of whether the tenants currently need resources.

Figure 5:
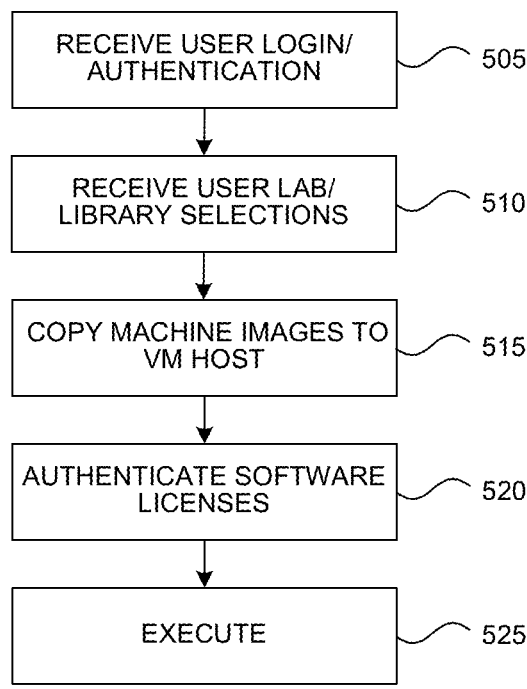
FIG. 5 is a flowchart illustrating the operation of a MTVMI in relation to a user in some embodiments.

FIG. 5 is a flowchart illustrating the operation of a MTVMI in relation to a user in some embodiments. The method of FIG. 5 can be viewed as a counterpart to the method illustrated in FIG. 3. In other words, while FIG. 3 illustrates actions performed by a user in relation to the MTVMI, FIG. 5 shows actions performed by the MTVMI in relation to a user.

Referring to FIG. 5, in step 505, the MTVMI receives user login and/or authentication information. Based on this information, the MTVMI determines whether to allow the user to access the MTVMI. Upon granting the user access to the MTVMI, in step 510, the MTVMI allows the user to configure a lab and any related software. In step 515, the MTVMI allows the user to perform authentication of any licenses for selected software. Alternatively, the MTVMI selects a predefined virtual machine configuration for the user. Upon determining virtual resources and any configuration to be used by the user, in step 520, the MTVMI binds the selected predetermined virtual machine configuration to a virtual host by communicating with the hyperviser for the virtual host. In step 530, the MTVMI begins executing the resources. During the execution of virtual machines within MTVMI, the MTVMI may run a console application to generate information on the user's display. In particular, the user can view and interact with the desktop console of the virtual machine in a display such as that shown in FIG. 3B.

Figure 6:
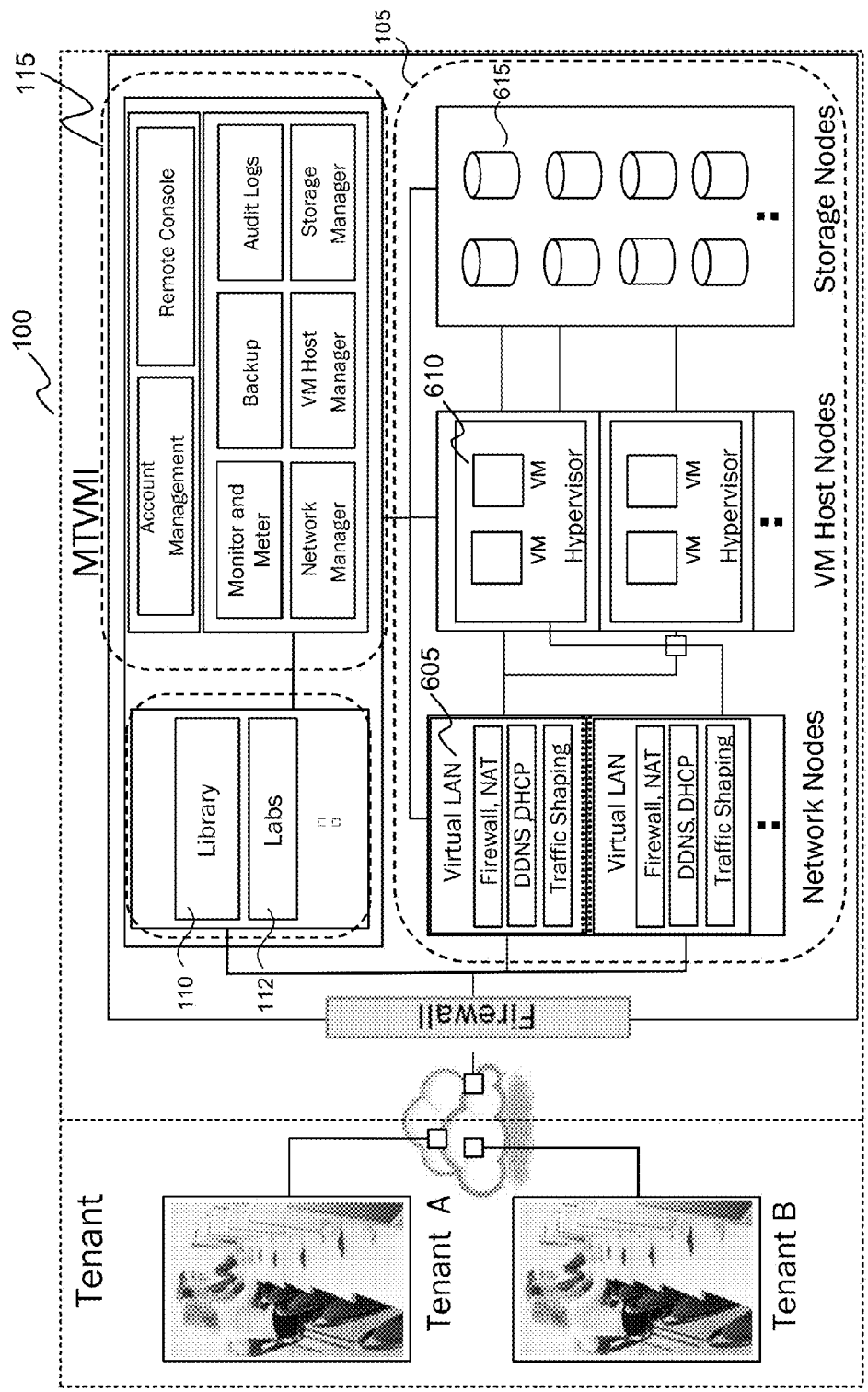
FIG. 6 is a conceptual diagram providing a more detailed system-level overview of a hosted multitenant virtual machine infrastructure in some embodiments.
Figure 6A:
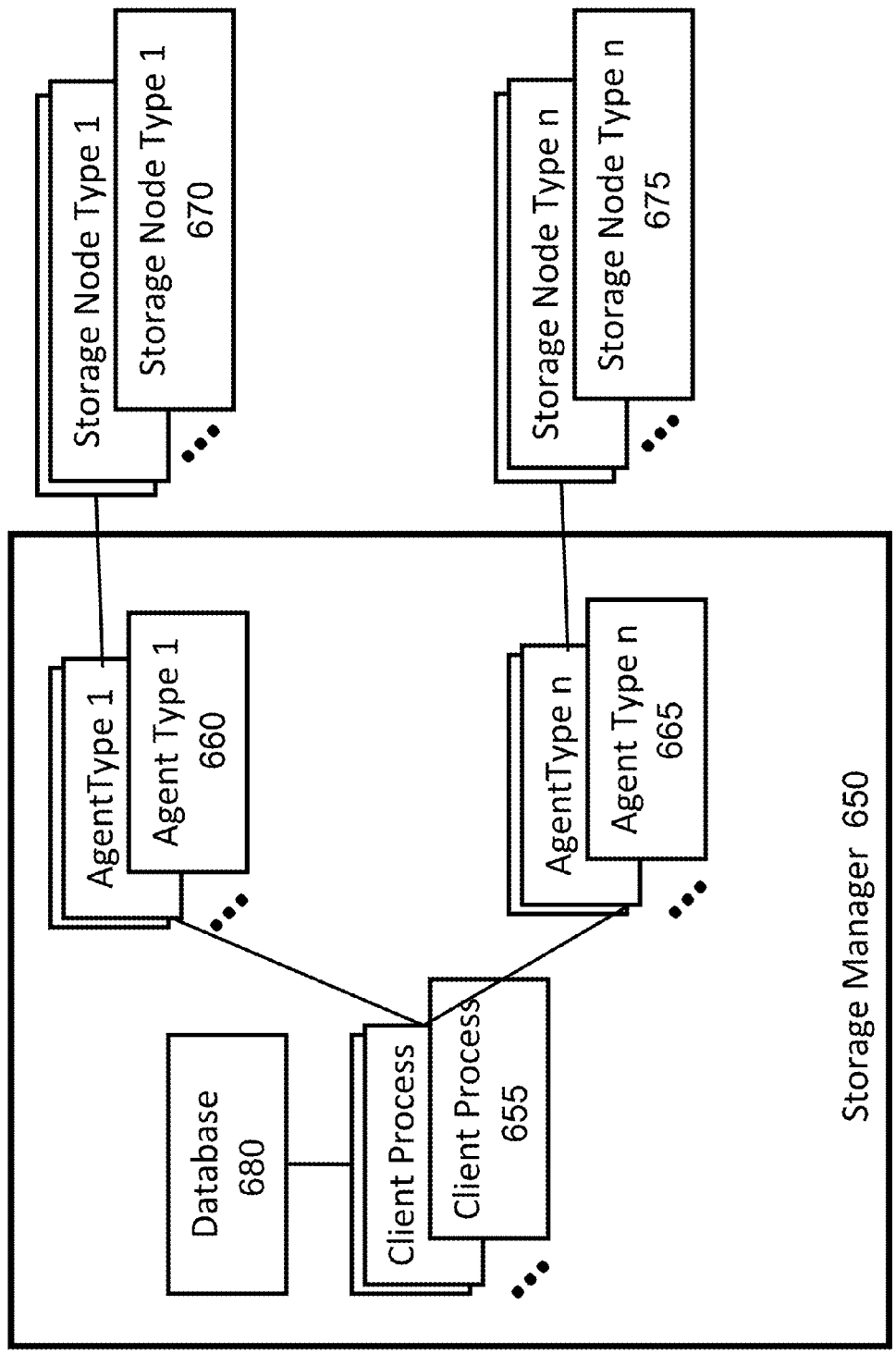
FIG. 6A is a block diagram illustrating a storage manager in some embodiments.

FIG. 6 is a conceptual diagram providing a more detailed overview of hosted MTVMI 100 shown in FIG. 1 in some embodiments. Further to the description of FIG. 1, FIG. 6, shows various example components that may be included in virtual infrastructure 105, software library 110, labs 112, and MTVMI management application 115.

In the example of FIG. 6, virtual infrastructure 105 comprises a plurality of network nodes 605, a plurality of virtual machine host nodes 610, and a plurality of storage nodes 615, each of which can be implemented using either general purpose commodity server hardware or server hardware more specialized to the roles of network processing, virtual machine execution, and high-volume reliable storage, respectively.

Each of the network nodes 605 comprises one or more physical machines that establish a virtual LAN for each virtual network specified by one of the labs 112. A virtual network connects together the virtual machines of a network, and enables them to access their corresponding virtual data stores on the storage nodes. In particular, to implement a virtual LAN, the network nodes establish an independent set of network services for each virtual LAN. These network services include such network services as virtual private network, firewall, network address translation, dynamic DNS, dynamic host configuration protocol service, and traffic shaping. In some embodiments, one or more of these services can be disabled for a particular virtual network. In some embodiments, the separate sets of network services are used to meter the usage of network bandwidth and/or network services individually for each virtual network. In some embodiments, the user may configure a virtual data center to specify whether, for each of these network services, a standard version is executed in the network node, or a specialized version is executed in the virtual machine. In a similar manner, the user can configure other networking aspects of the virtual LAN, such as by setting their own static IP addresses which are private only or public, connecting individual VPNs from each virtual machine to their own corporate data center, collectively connecting all the virtual machines in a configuration to their own corporate data center, setting their own domain name, running their own domain name server etc. In some embodiments, one or more of these network nodes work cooperatively as a load-balancing cluster or a failover cluster.

Each of virtual machine host nodes 610 comprises one or more physical machines capable of executing one or more virtual machines. Each physical machine has a corresponding hypervisor and the one or more virtual machines runs on top of the hypervisor.

Each of storage nodes 615 comprises one or more physical data storage media. These storage media may provide virtual storage for virtual machines and virtual data clusters running within the MTVMI. In some embodiments, the MTVMI uses load-balancing techniques to select for each virtual machine the storage node that is assigned to provide virtual storage to the virtual machine. In some embodiments, the MTVMI further provides intelligent data placement, dynamic data replication, and/or dynamic data migration. Intelligent data placement involves strategically selecting one or more storage nodes in which to store particular data. For example, an image for a popular operating system may be placed on multiple storage nodes in order to provide for high expected demand for the operating system among virtual machines. Dynamic data replication involves creating additional copies of particular data on different nodes in order to provide better performance for accessing the data. Dynamic data migration involves moving data to a different storage node, such as to relieve a bottleneck. Typically, these mechanisms are implemented by monitoring and collecting data about the behavior of host nodes and/or storage nodes and associated workload levels, such as which objects are more used than others, and policy intelligence for making determinations based upon this input. In some embodiments, the storage nodes provide virtual network attached storage devices for use by virtual machines running within the MTVMI.

In some embodiments, the MTVMI uses copy-on-write techniques that represent a child image stored at a later time for particular virtual machine as a set of changes made to a parent image stored for that virtual machine at an earlier time. In such embodiments, a dependency exists in the child image on the parent image. Where the parent image is to be moved to a different storage node, the MTVMI may migrate the child image with the parent image, or it may break the dependency of the child image on the parent image by transforming the representation of the child image into a complete copy of the child image.

Additionally, storage nodes may provide long and/or short term data storage for tenant information such as virtual data center configurations, and data archives. In various alternative embodiments, storage nodes 615 may be populated by users or tenants directly interacting with MTVMI 100, or through automatic processes such as automatically downloading content stored in another data storage system.

The Storage Manager component of the VLAB is responsible for all storage-related operations. The Storage Manager defines a distinct layer on top of the underlying storage products. The purpose of this layer is to present a unified view across these mechanisms, both to centralize storage knowledge within the application and to insulate the rest of the application from the numerous details of the actual storage implementation.

This layering supports:
- portability across a wide range of lower-level storage implementations, allowing different COTS storage products to be deployed on the VLAB as needs determine
- improved supportability and maintainability
- optimal use of underlying storage capabilities, as the upper layer interrogates the lower layers as to capacity/usage, load, and health status and then delegates specific operations to the selected node
- unified management of basic storage operations that can span multiple or dissimilar underlying storage products—e.g. backing up, relocating, or replicating data
- redundant data storage for improved availability
- horizontal scalability (by adding nodes and agents)
- resource isolation, for performance, security or availability considerations—e.g., by isolating a specific tenant's use of storage to a specific subset of nodes The Storage Manager is comprised of:
- A collection of "storage nodes" which provide the actual storage. In some embodiments, these are COTS (Common Off The Shelf) storage products. There may be several types (with distinct capabilities) present in the system at any time.
- A collection of agent processes that run on or near the storage nodes. Each agent acts as an adapter that supports a common API and semantics across the different underlying storage systems.
- A client library that is embedded into client processes. The library provides local-API access to all storage capability, manages the overall state of the storage subsystem, acts as a communication channel to the agents, and collects performance and load data for the agents.
- A database and tables that store the state of the storage subsystem and allows concurrent operations to proceed safely.

Overall, the client processes that embed the client library determine how to allocate responsibilities to individual storage nodes. For example, the client processes determine: for particular data that is to be stored, on what storage node(s) to store it; when to move particular data from one storage node to another; when to replicate data on one storage node to another; and, in response to a retrieval request for particular data that is stored on each of multiple storage nodes, which node to retrieve the data from. In making such determinations, the client processes consider content, capacity/usage, performance, load, health, and affinity information that the Storage Manager collects and maintains for each of the storage nodes. In many cases, determinations made by client processes involve determining a subset of feasible nodes, then selecting a node from among the feasible nodes.

If new content must be stored that has a dependency on pre-existing content (e.g., creating a copy or snapshot of existing content), then the nodes that have that pre-existing content are the subset of feasible nodes. If content must be retrieved, then the subset of nodes that have that specific content is the feasible subset. In selecting one node from among the set of feasible nodes, the client processes seek to avoid nodes that are less healthy (e.g., their disks are in a degraded state) and to prefer nodes that have lower usage and load. Other choices are possible. In particular, tenants of the service can be assigned an affinity to a specific subset of nodes (and vice versa where a node is assigned affinity to a subset of tenants), such that requests on behalf of that tenant will target this subset of affinity nodes.

Logic to determine which content should be replicated or migrated and to which node is also based on the same attributes as above. The logic additionally schedules these operations during a window when there is less performance impact. In addition, system administrators can manually trigger replication/migration of specific data to specific nodes.

Software library 110 comprises software programs for use by tenants and associated users who interact with MTVMI 100. As examples, software library 110 may include a library of commercial and/or private software applications available to a tenant, and a set of software configurations created by the tenant or accessible to the tenant. In some embodiments, software library 110 may be connected to a licensing module to negotiate on-demand licensing of proprietary software to tenants, or management of a limited number of existing licenses among multiple users.

Management application 115 comprises components for managing and monitoring user access to MTVMI 100. As shown in FIG. 6, for instance, management application 115 may comprise an account management component for managing a tenant's account data, a remote console component for displaying a graphical user interface in a user's local display, a monitoring and metering component for tracking resource usage by different tenants and users, a backup component for maintaining backup copies of the data stored by storage nodes 615, an audit logs component for maintaining audit logs documenting all the actions performed by each tenant's users, a network manager component for allowing a tenant to connect its own physical data center resources to MTVMI 100, a VM host manager component for controlling the creation and functioning of virtual machines within MTVMI 100, and a storage manager component for coordinating tenant and user access to storage nodes 615.

In addition to these components, in some embodiments, management application 115 further includes a billing system component for monitoring a tenant's use of resources within MTVMI 100 and producing an invoice. The monitoring may occur, for example, by tracking the amount of CPU time or data storage consumed by the users associated with each tenant.

In some embodiments, management application 115 further comprises a resource allocation module for facilitating inclusion of external (i.e., non-local or other third party) resources into MTVMI 100. In this way, MTVMI 100 can be used to provide potentially brokered access to computing, storage and network resources regardless of where the resources are physically located. Such access can be provided according to policies for achieving any number of tenant or user objectives, such as, e.g., cost, reliability, security, availability, and performance.

In some embodiments, management application 115 further includes a module for specifying a grid configuration of a virtual network based on input from a tenant. A grid configuration is a specification of the topology of a set of virtual machines and related networks and storage systems. The grid configuration module could generate the grid configuration by receiving a tenant's description of an existing physical or virtual network in the form of a tenant-created file or data structure, and then modifying the description into a form usable by MTVMI 100. The grid configuration can subsequently be imaged onto MTVMI 100 for use by particular tenant or user.

Management application 115 may further comprise a security component for allowing tenants to restrict the rights of users to specific physical or virtual resources, configurations, and other software resources within MTVMI 100. For instance, when establishing an account for MTVMI 100, a tenant could specify a set of users with access to a particular software suite within MTVMI 100, and a set of users without access to the software suite. The security component could then monitor access to the suite based on the tenant's specification. Additionally, the security component could issue alters or perform other actions in response to attempts at illicit access, etc.

In some embodiments, management application 115 further comprises policy component allowing tenants to modify resource quotas among individual users associated with the tenant, or among all users associated with the tenant. More generally, the policy component could allow tenants to modify any aspect of the tenant's subscription agreement with MTVMI 100.

In some embodiments, management application 115 further comprises maintenance components such as patching and virus protection software for updating different the configurations of tenants' different virtual networks, backup or replication software for storing redundant copies of virtual machines, application packages, installation and testing tools and services, etc. In general, these maintenance components may operate with or without input from tenants or users, with or without oversight by the entity hosting MTVMI 100, and in a fully automated, partially-automated, or non-automated manner.

In components allowing tenant or user interactions with MTVMI 100, such interactions may take place through a variety of different interfaces, such as graphical interfaces, command line interfaces, programming interfaces, and so on.

Management application 115 may further include custom monitoring and management components created by tenants or users. To implement these custom features, a user could create scripts or application programs using a scripting program or an application programming interface (API) compatible with MTVMI 100. To facilitate the creation of such programs, management application 115 may additionally include a software development platform for MTVMI 100. By allowing tenants and users to create custom software components, MTVMI 100 may provide flexibility and unique capabilities useful to a variety of users having a variety of needs.

In addition to the above-described components and features, management application 115 may further comprise software applications for providing specific virtualization-based services to tenants and users within MTVMI 100. Examples of such services will be described below with reference to FIGS. 7 and 8. A more specific example of the service of FIG. 8 will then be described with reference to FIGS. 9-22.

Figure 7:
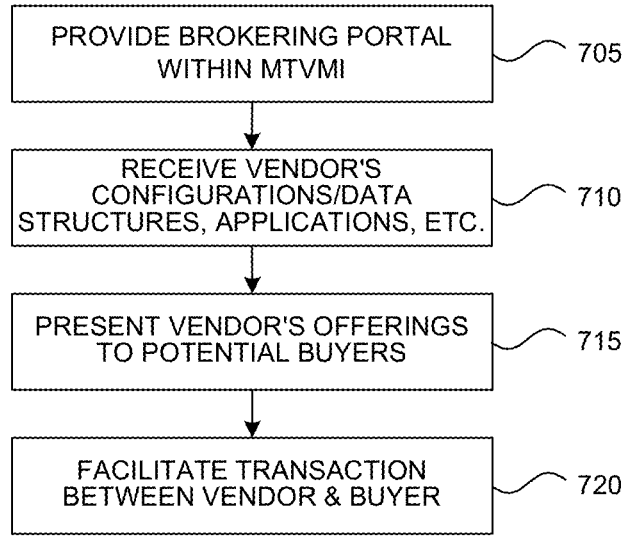
FIG. 7 is a flowchart illustrating the provision of a software brokering service by an MTVMI in some embodiments.

FIG. 7 is a flowchart illustrating the provision of a software brokering service by MTVMI 100 in some embodiments. The service of FIG. 7 is provided by a software brokering portal where tenants and users are allowed to exchange software and other data that may be useful within MTVMI 100. The data may include, e.g., custom virtual machine or virtual network configurations, software applications written by independent software vendors, custom scripts or programs written for MTVMI 100, infrastructure models, data models, user rights hierarchy models, process workflows, controls, reports, and financials, to name but a few.

In step 705, MTVMI 100 provides a brokering portal. In one example, the brokering portal comprises a software application that presents a graphical user interface within a user's display. The graphical interface may include a mechanism for presenting available software and/or data that can be downloaded by the user. The graphical user interface may further include a mechanism for allowing the user to upload software to the portal. In some embodiments, the MTVMI grants access to the tenant to software that is already available within the MTVMI. The portal may require the user to provide a form of payment to download certain software or data. Alternatively, the software or data may be provided free of charge.

In step 710, MTVMI 100 receives data from the user through the portal and stores the data in a common access area. For explanation purposes, a user who uploads data to the portal is referred to as a seller in FIG. 7, even though the portal does not necessarily require users to exchange payment for sharing data. Similarly, a user who downloads software from the portal will be referred to as a buyer.

In step 715, MTVMI 100 presents data to potential buyers within the portal. In step 720, where money transactions are involved in the transfer of data, MTVMI 100 facilitates those transactions, e.g., by allowing users to debit or credit bank accounts, deposit accounts within MTVMI, or by adding incurred expenses to a tenant's MTVMI account.

In various embodiments, the MTVMI and the portal together support a variety of uses, including application development and testing; online education; pre-sales software demonstration; consulting platform; and IP prototyping and operations.

Figure 8:
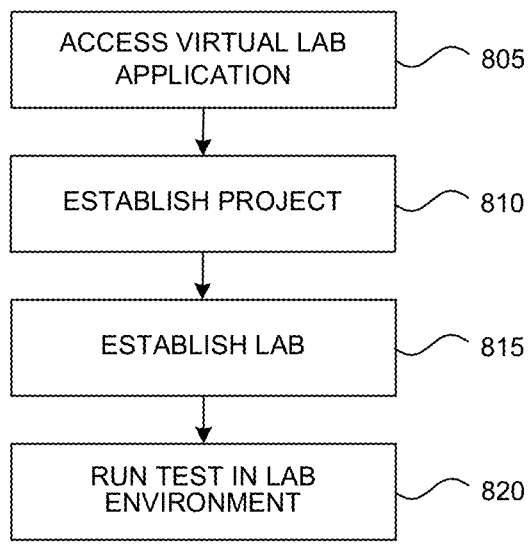
FIG. 8 is a flowchart illustrating the provision of a virtual lab service by an MTVMI in some embodiments.

FIG. 8 is a flowchart illustrating the provision of a virtual lab service by an MTVMI in some embodiments. In the example of FIG. 8, the user creates a virtual lab and executes a software test using the virtual lab. A virtual lab is a set of virtual computing resources configured to operate in concert to perform one or more related computing tasks. As an example, a virtual lab may comprise a set of virtual machines and related software configured to process a large data set such as a genome sequence, or a large video or simulation. A virtual lab may be particularly useful for computing tasks that are performed on a one-time or limited basis, such as software testing, graphics rendering, and so on. However, virtual labs can also be useful for performing recurring tasks requiring a significant amount of computing power. Other example steps that could be performed within a virtual lab application will be apparent from the description presented below in relation to FIGS. 9-22.

Referring to FIG. 8, in step 805, a user accesses a virtual lab application within MTVMI 100. The virtual lab application may generate a graphical user interface on the user's display, such as the interface illustrated in FIGS. 9-22. Upon accessing the virtual lab application, in step 810, the user creates, or accesses one or more projects. A project is a data structure or description that specifies a set of virtual resources and a set of users that can access the resources specified by the project. In some embodiments, resource usage is separately measured and quota compliance is separately enforced for each project. By specifying both users and virtual resources, the project allows specific lab instances to be developed through a collaborative process among the users. Example projects will be described in further detail below with reference to FIGS. 9-10. In some embodiments, a tenant's administrative user can specify resource permissions at a variety of different levels of scope, including private scope in which permissions are established for a single user, or tenant-wide scope in which permissions are established for all users for a particular tenant. Resource permissions can also be specified at all-tenant scope, in which permissions are established for users of all tenants. Such permissions may relate to items from the software library, the labs, or asset lists established by or for tenants.

After establishing the project, in step 815, the user creates a lab by selecting and configuring particular resources within the project. As an example, the user may select a set of virtual machines from the project, specify particular operating systems for the virtual machines, and identify software applications to be run on the virtual machines. Examples labs will be described in further detail below with reference to FIGS. 9 and 11-12.

Once the project and lab have been created, in step 820, the user runs the lab to perform a particular computational task—in this case, a software test. An example of a software test performed in a virtual lab will be presented below with reference to FIGS. 9-22.

FIGS. 9-22 are display diagrams showing a user interface presented by an example software application running on a MTVMI to provide a virtual lab service in some embodiments. The virtual lab service is available on-demand over the Internet and allows users to rapidly build and configure software test environments using a pre-built library of virtual machine images. The virtual lab service further allows users to create virtual infrastructure such as virtual processing, networking, and storage facilities on demand using a browser. Finally, the virtual lab service allows users to share data and collaborate with other users who are also connected to the virtual lab environment via the Internet.

The operation of the virtual lab service will be explained below using a concrete example involving an engineer uses a MTVMI to test an e-commerce website on behalf of a tenant having users located in different parts of the world. The engineer may share components of the virtual lab with the other users associated with the tenant.

Figure 9:
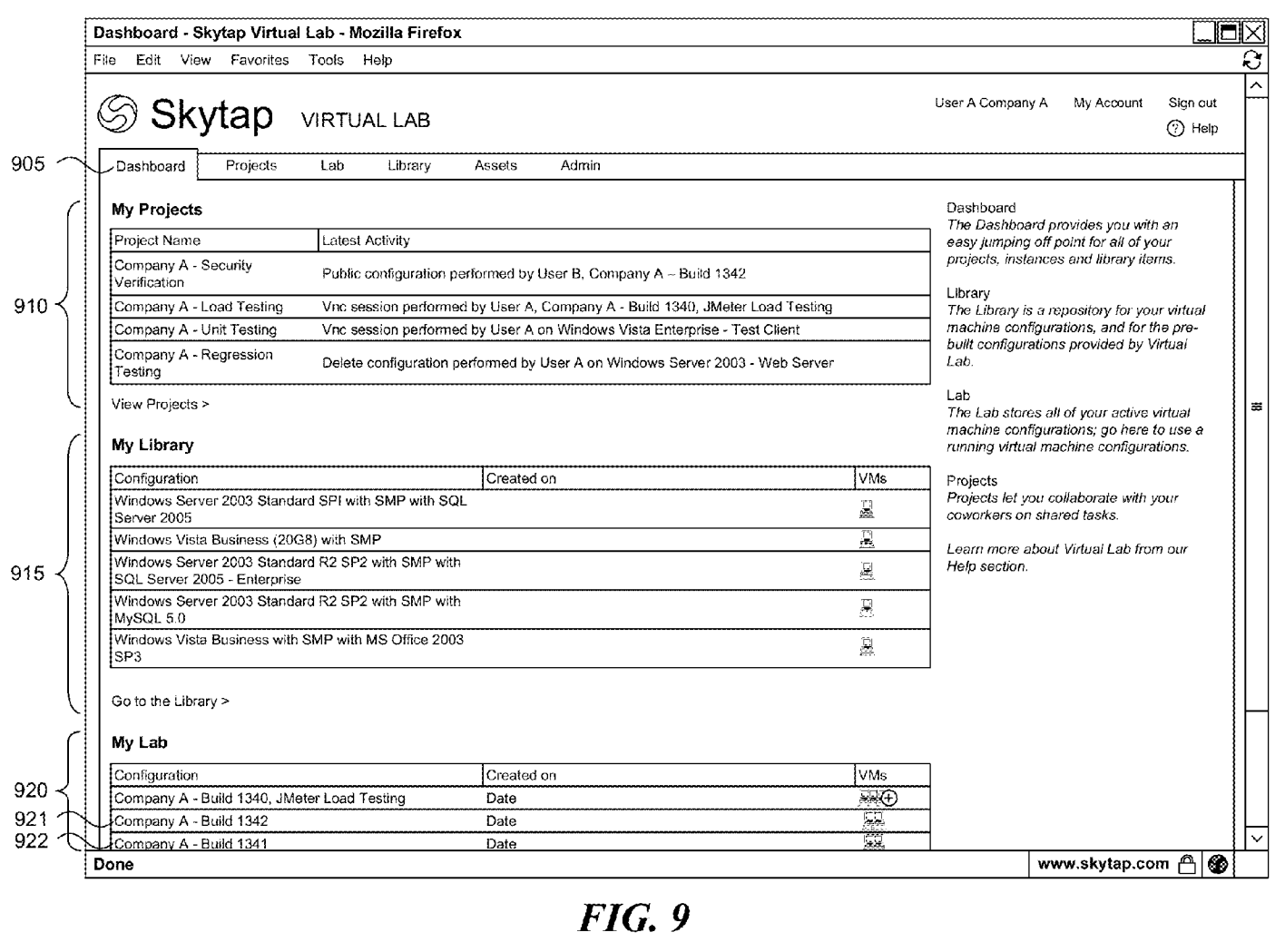

FIG. 9 illustrates a screen that appears after the engineer logs on, through a secure connection, to a MTVMI hosting the virtual lab service. In this regard, the screen of FIG. 9 corresponds to an entry point for the virtual lab service. As seen in FIG. 9, the screen includes a tab labeled as dashboard 905.

Dashboard 905 includes information related to current projects and recently used items within the engineer's scope of user privileges. In particular, dashboard 905 includes a set of projects 910, software libraries 915, and labs 920 associated with the engineer. The projects 910, libraries 915, and labs 920 of FIG. 9 may be created within the illustrated application, or they may have been created previously.

In the current example, we will assume that the engineer will deploy a lab that was previously created. To do this, the engineer may simply select the lab from the list 920 shown under the heading "My Lab". As an example, to select the lab illustrated in FIG. 11, the engineer may select a lab 921 entitled "Company A—Build 1340". Similarly, to select the lab illustrated in FIG. 12, the engineer may select a lab 922 entitled "Company A—Build 1341". By selecting one of these labs, the user can bring up the screen shown in FIG. 11 or FIG. 12, which will be described in further detail below.

In testing the e-commerce site, the engineer verifies the site's scalability and performance on virtual machines defined in the selected lab. A realistic test of a e-commerce site typically requires a large number of machines. However, the test generally only requires the use of the machines for a short period of time, say, a few days or weeks at most. Accordingly, by performing the test in this virtual lab, the engineer avoids the need to requisition actual hardware and the corresponding large expense, as would generally be required to test the site in a non-virtual environment.

In addition to eliminating the need to requisition physical hardware, the virtual lab service also enables the engineer to quickly configure and launch a test environment. In contrast, tests using actual machines often require hours of setup time for connecting machines, installing software, booting up the machines, and so on. In selected embodiments of the virtual lab service, virtual machines can be requisitioned and launched without requesting use of the virtual machines in advance. This is typically possible in a MTVMI where the amount of available computing power is large in relation to the instantaneous user demand.

FIG. 10 shows a projects tab 1005 within the virtual lab service. Projects tab 1005 provides information 1010 regarding a particular project ("Company A—Security Verification") accessible to the engineer, virtual machine configurations 1015 available within the project, running configurations 1020 within the project, and assets 1025 associated with the project. Each of these features will be described in additional detail below with reference to the remaining figures.

Figure 11:
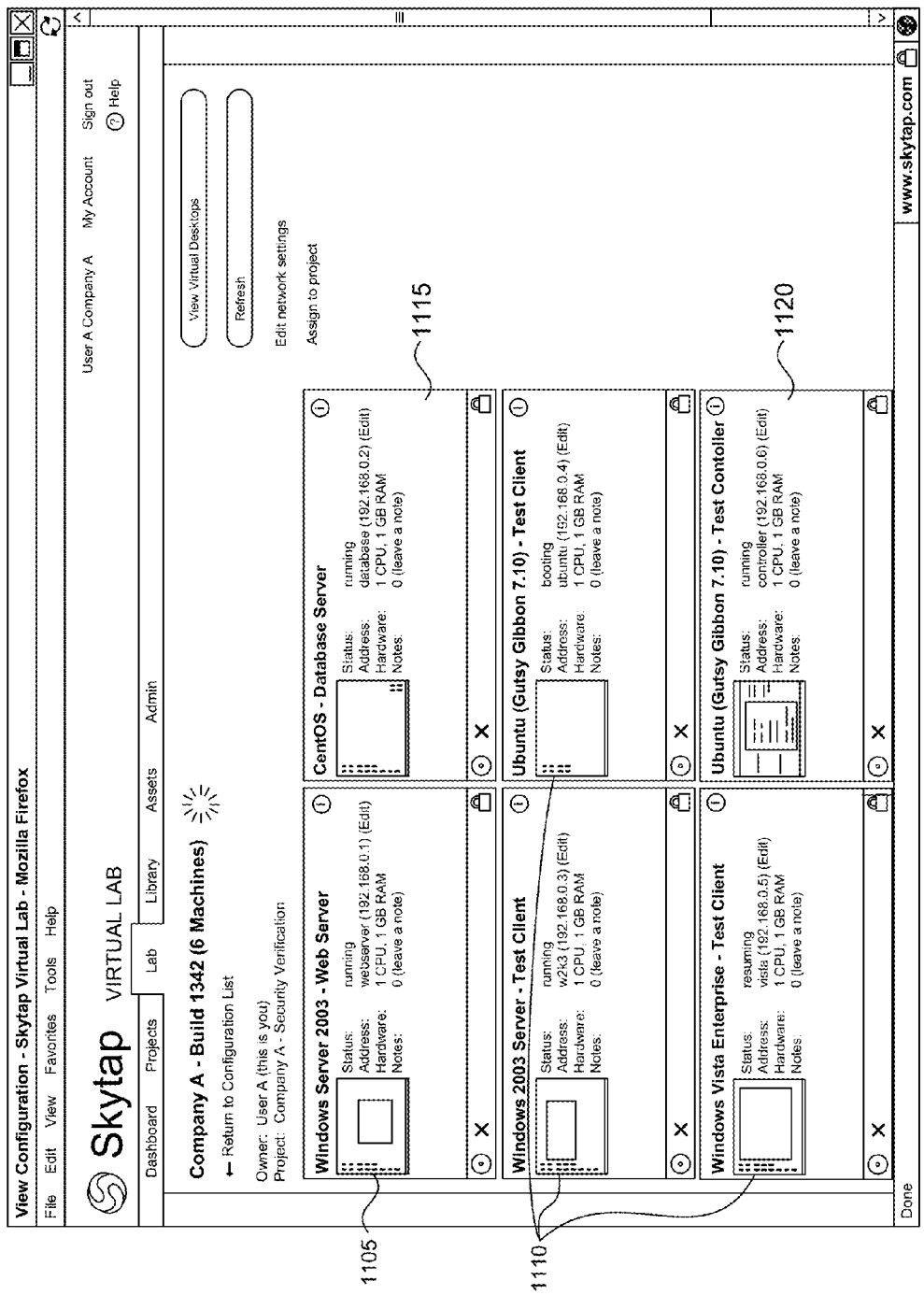
Figure 12:
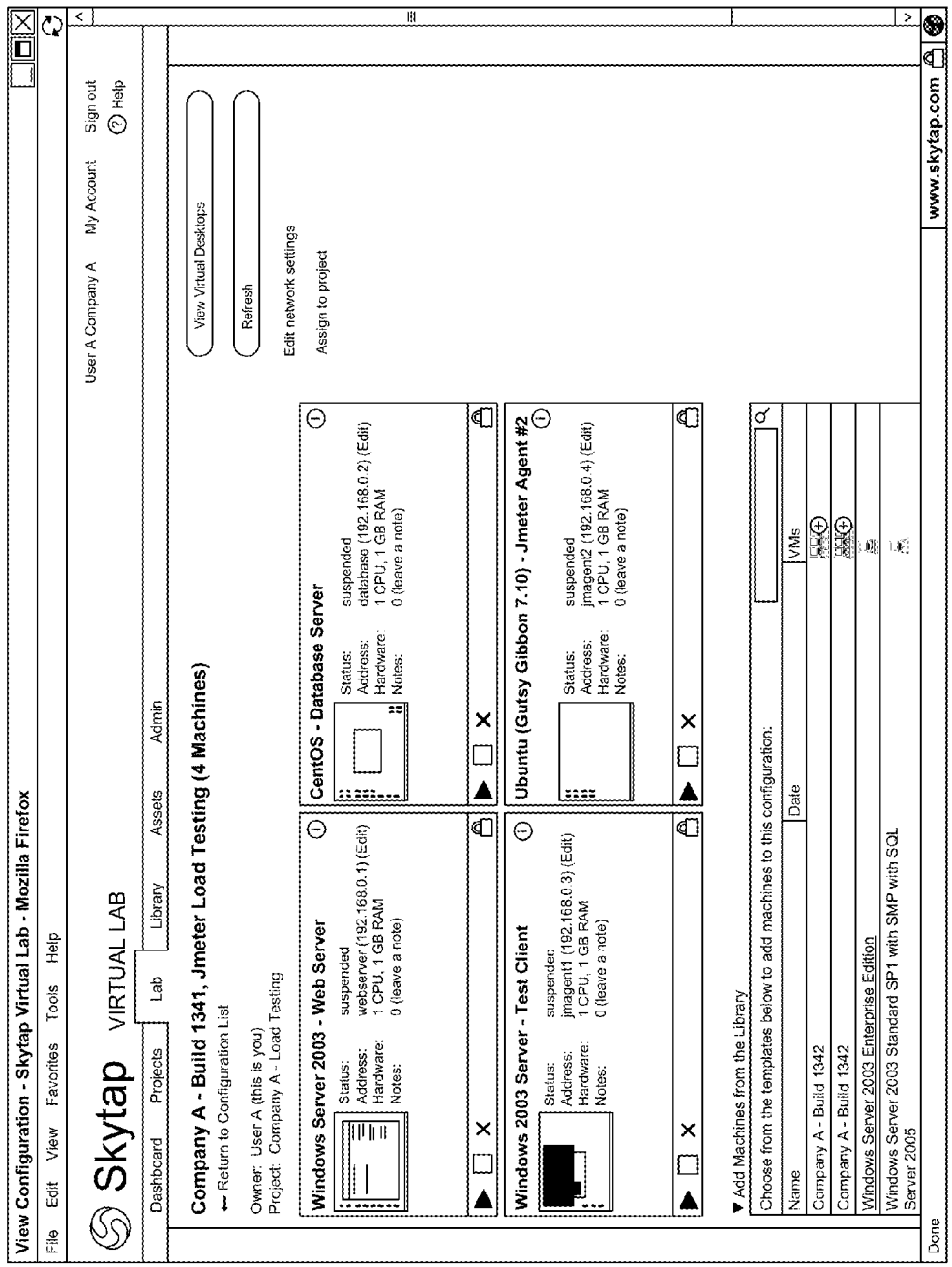

FIGS. 11 and 12 illustrate different labs available to the engineer. As seen in the figures, these labs each include a number of virtual machines. Each virtual machine is visually represented by a thumbnail image of the console display currently being generated by the virtual machine. For illustration purposes, each of the virtual machines has a been configured with a unique combination of computing characteristics, operating system, and status. For instance, in FIG. 11, a web server 1105 is implemented by a virtual machine having a 1 GHz CPU, 1 GB of RAM, and running the Microsoft Windows operating system. Within a virtual network, web server 1105 has a network address "192.168.0.1" and a status "running". Other virtual machines have different configurations, including different operating systems, different statuses, and so forth. Once machines are up and running in the illustration of FIGS. 11 and 12, the engineer can click on a thumbnail image of any one of the virtual machines to interact with the machine through the engineer's local interface.

In the examples of FIGS. 11 and 12, the status of each virtual machine (e.g., running, booting, resuming) can be indicated by both a textual indicator and a background color around the corresponding virtual machine icon. The virtual lab service may allow users to modify virtual network settings such as domains, subnet attributes and IP addresses of virtual machines within a particular lab.

In some embodiments, the virtual lab service enables the user to generate a snapshot of one or more running virtual machines, such as a single virtual machine, all of the virtual machines in a virtual network, or all of the machines in a configuration. For example, the user may select a visual control associated with the machine, network, or configuration in order to generate a snapshot. When a snapshot is generated, complete state for each of the virtual machines including the snapshot is stored in the library. After the snapshot is generated, this item may be selected from the library in order to instantiate any number of new instances of the set of virtual machines that were the subject of the snapshot. This is useful, for example, to establish a large number of initially identical instances of a particular configuration. Also, in a testing project, it can be useful for a tester who has just produced an error in a configuration being tested to establish a snapshot of the configuration that can be reviewed later by a developer to determine the conditions under which the error occurred.

In some embodiments, the virtual lab service allows the user to generate for a particular virtual machine a URL that can be used, in the absence of any other identifying information, to access the console display for that virtual machine. This URL can be distributed to users that are not authorized under the tenant's account to provide access to this particular virtual machine to those users. Such access may permit only observing the console display of the virtual machine, or it may permit user interface interactions with the virtual machine. In some embodiments, the user can click on a CD icon displayed by the MTVMI in connection with a virtual machine (not shown) in order to upload to the asset list and/or the library a virtual machine image or a software installation file such as an ISO file from the user client machine.

Figure 13:
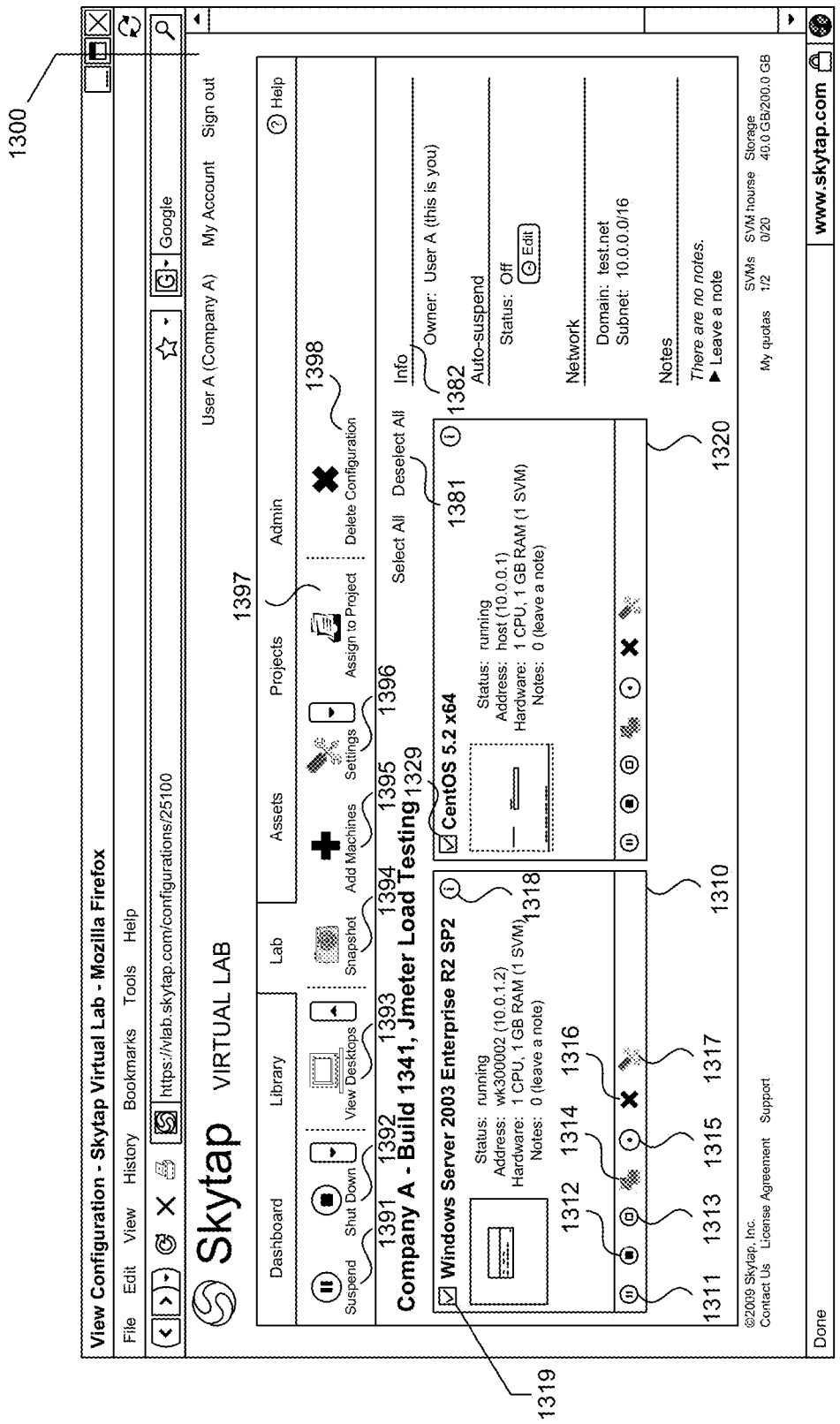

FIG. 13 is a display diagram showing a sample display typically presented by the infrastructure in order to permit a user to control the operation of virtual machines. The display 1300 shows information 1310 and 1320 for two virtual machines. The information 1310 for the first virtual machine includes information describing the virtual machine, as well as the following controls: a run/suspend control 1311 for beginning or suspending execution of the virtual machine; a shut down control 1312 for invoking an operating system function on the virtual machine designed to turn the computer system running the operating system off; a power off control 1313 for immediately disabling the virtual machine and discarding its memory state; a RDP connection control 1314 for establishing an RDP connection with the virtual machine; an ISO control 1315 for loading a memory image ISO file from a CD-ROM to the virtual machine; a delete control 1316 for deleting the virtual machine; and a settings control 1317 for editing network and hardware attributes of the virtual machine. Each of controls 1311-1317 operate specifically with regard to the virtual machine identified by virtual machine information 1310. The display also includes controls 1391-1394 which, when operated by the user, operate with respect to every virtual machine whose check box (e.g., check boxes 1319 and 1329) is checked. The display also includes controls 1381 and 1382 for respectively selecting all of the virtual machines and deselecting all of the virtual machines.

Figure 14:
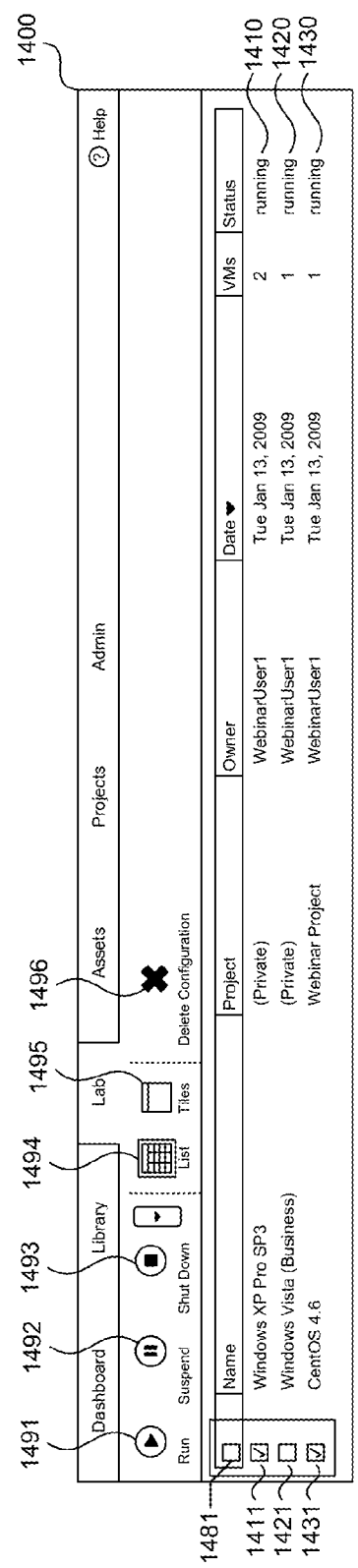

FIG. 14 is a display diagram showing a sample display typically presented by the infrastructure to display information about and allow interaction with machine configurations available to a user. The display 1400 includes entries 1410, 1420, and 1430 each corresponding to a different machine configuration that is accessible to the user. In a manner similar to that discussed above in connection with FIG. 13, these entries contain check boxes 1411, 1421, and 1431, respectively. Each of these can be checked so that controls 1491, 1492, 1493, and 1496 operate with respect to the corresponding virtual machine. The display also includes controls 1494 and 1495 for switching between a list view of configurations and a tiles view of configurations, respectively.

Figure 15:
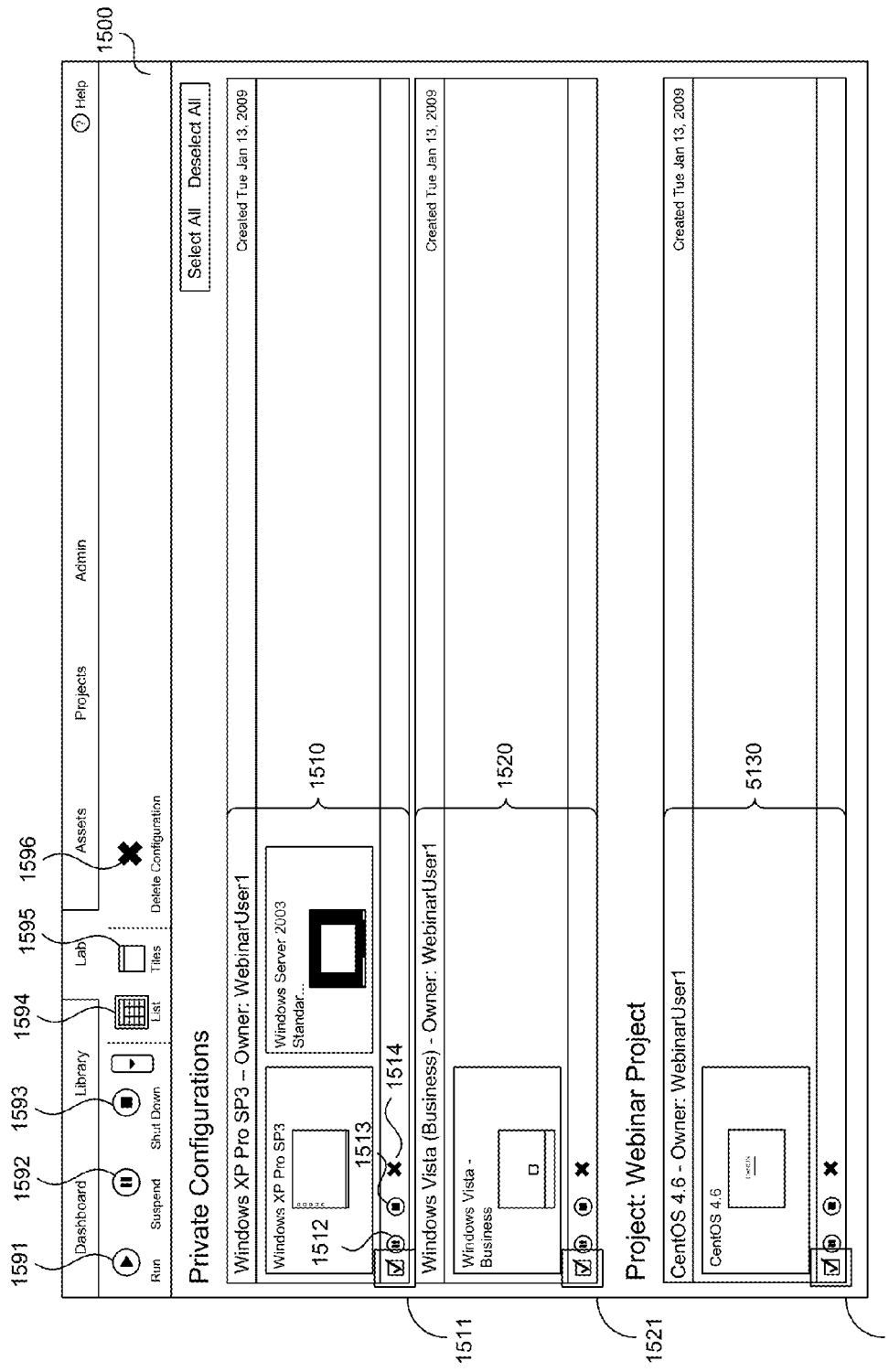

FIG. 15 is a display diagram showing a sample display typically presented by the infrastructure to display information about and permit manipulation of machine configurations in a tiles view. The display 1500 includes sections 1510, 1520, and 1530, each containing information about a different machine configuration. For example, information 1510 about the first machine configuration shows two virtual machines, and includes controls 1512, 1513, and 1514 whose operation affects each of the virtual machines in the first configuration. Information 1510 further includes a check box, like check boxes 1521 and 1531 for other machine configurations, that determines whether controls 1591, 1592, 1593, and 1596 apply to the configuration.

Figure 16:
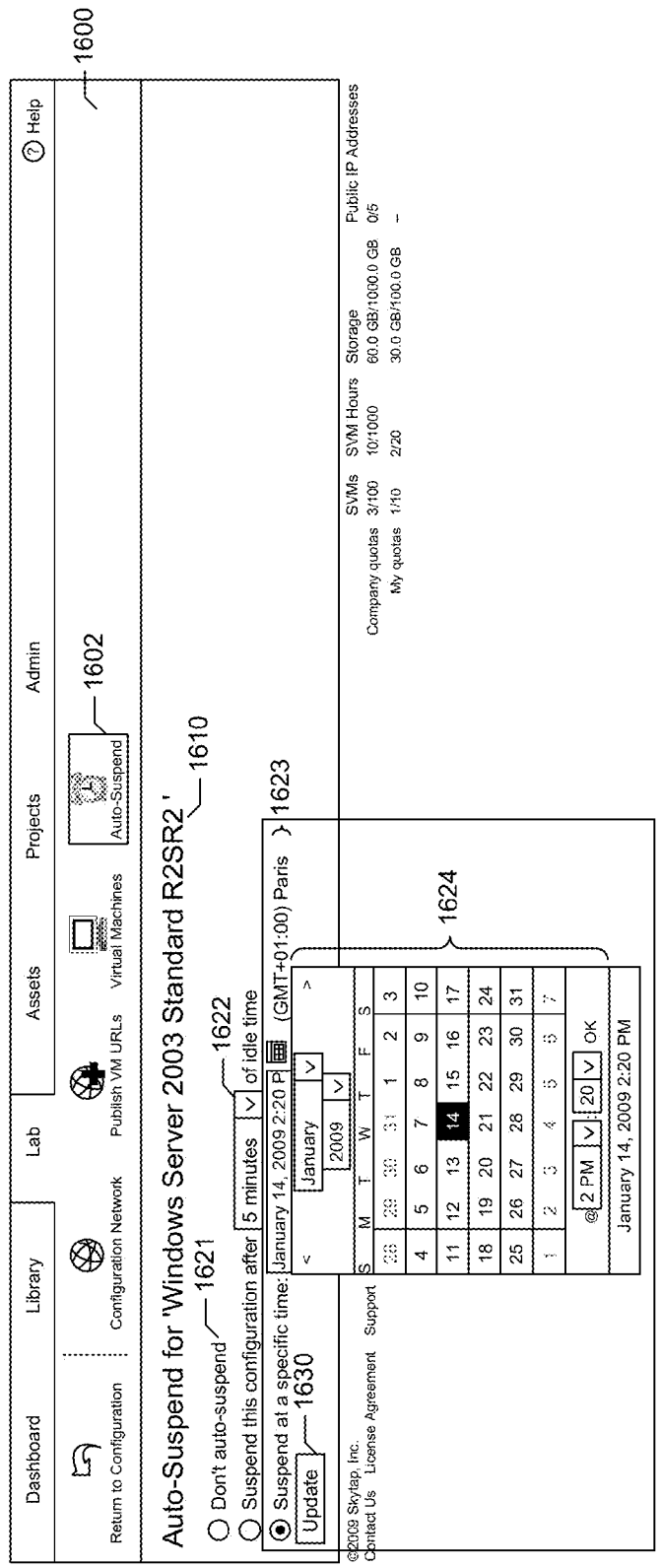

FIG. 16 is a display diagram showing a sample display that is typically presented by the infrastructure in order to permit the user to specify automatic suspension of the virtual machines in a machine configuration. The display 1600 may be reached by selecting an auto-suspend control 1602. The display includes information 1610 identifying the machine configuration. The infrastructure permits selection between the following options for suspending this machine configuration: an option 1621 not to automatically suspend this machine configuration; an option 1622 for suspending the machine configuration after all of the virtual machines in the configuration have been idle for at least a user-specified amount of time; and an option 1623 to suspend the virtual machines of the machine configuration at a user-specified time and date. The display also includes an update control 1630 for updating the auto suspension settings for this machine configuration.

Figure 17:
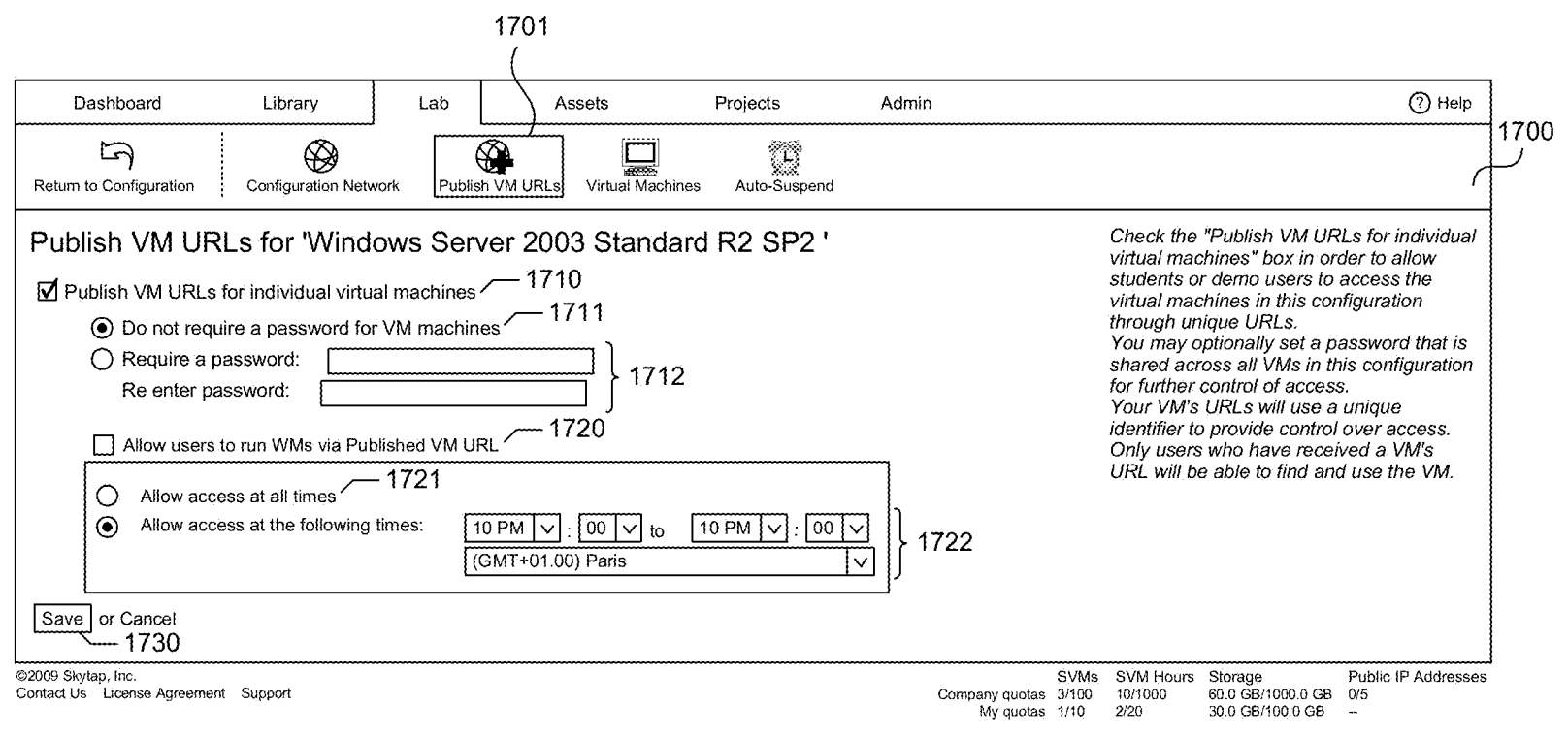

FIG. 17 is a display diagram showing a sample display typically presented by the infrastructure in order to publish URLs for accessing virtual machines of a machine configuration. The display 1700 can be reached by selecting a Publish VM URLs control 1701. The display enables the user to determine with option 1710 whether URLs are generated and activated for accessing the consoles of the virtual machines of the current machine configuration. Where option 1710 is selected, the user can elect between option 1711 in which passwords are not required in order to access a virtual machine using its URL and 1712 where a user-specified password is required to access each virtual machine in the machine configuration. Also, where the user selects option 1710, the user can determine whether to select option 1720 for allowing users who access a virtual machine in the machine configuration using its published URL to control the virtual machine as contrasted with merely viewing its console output. Also, where the user selects option 1710, the user may elect between option 1721 to allow those in possession of a virtual machine's URL to access it at all times, and option 1722 to allow access only during a user-specified time-of-day range. The display 1700 also includes a save control 1730 to update these attributes of the current machine configuration.

Figure 18:
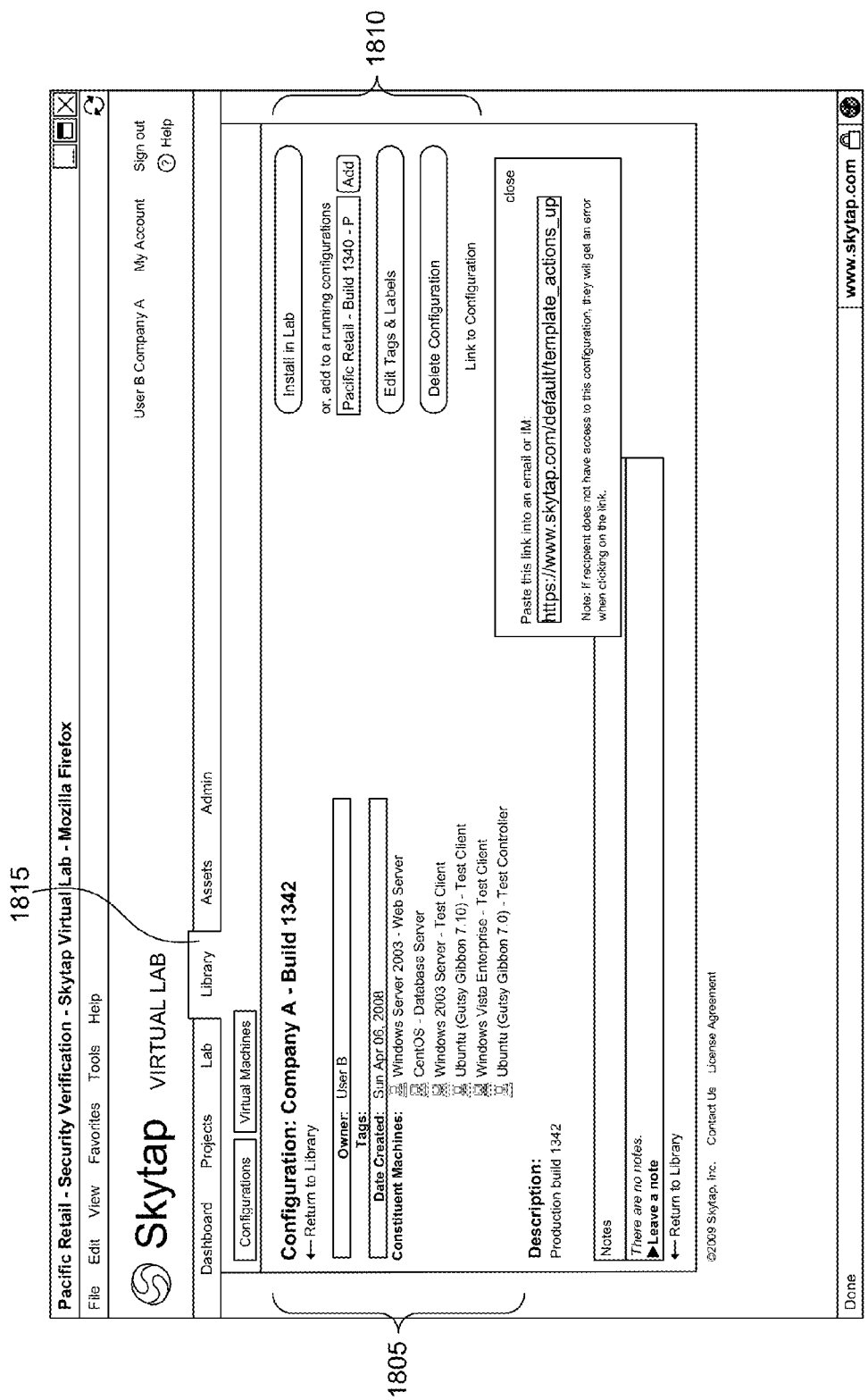
Figure 19:
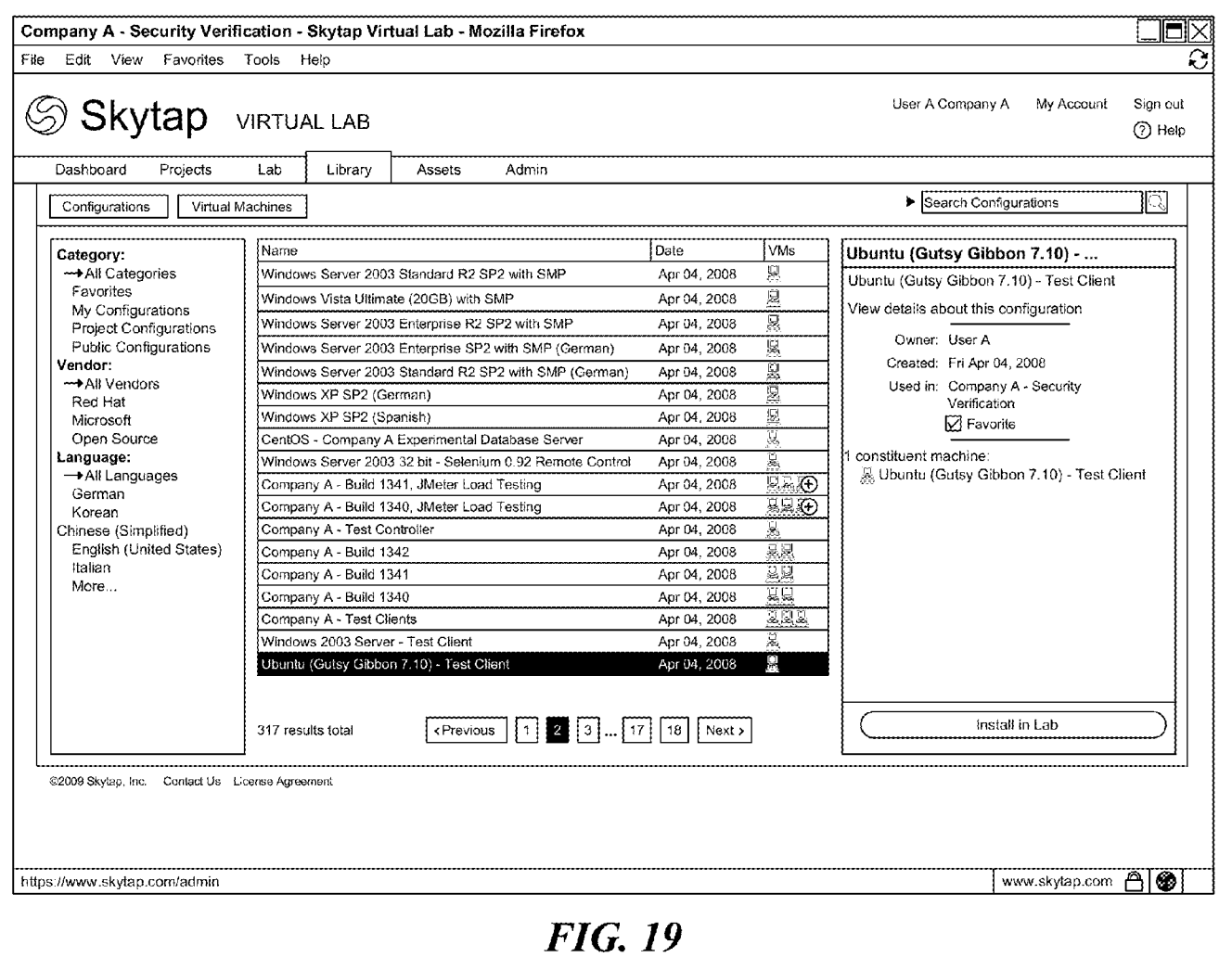
Figure 20:
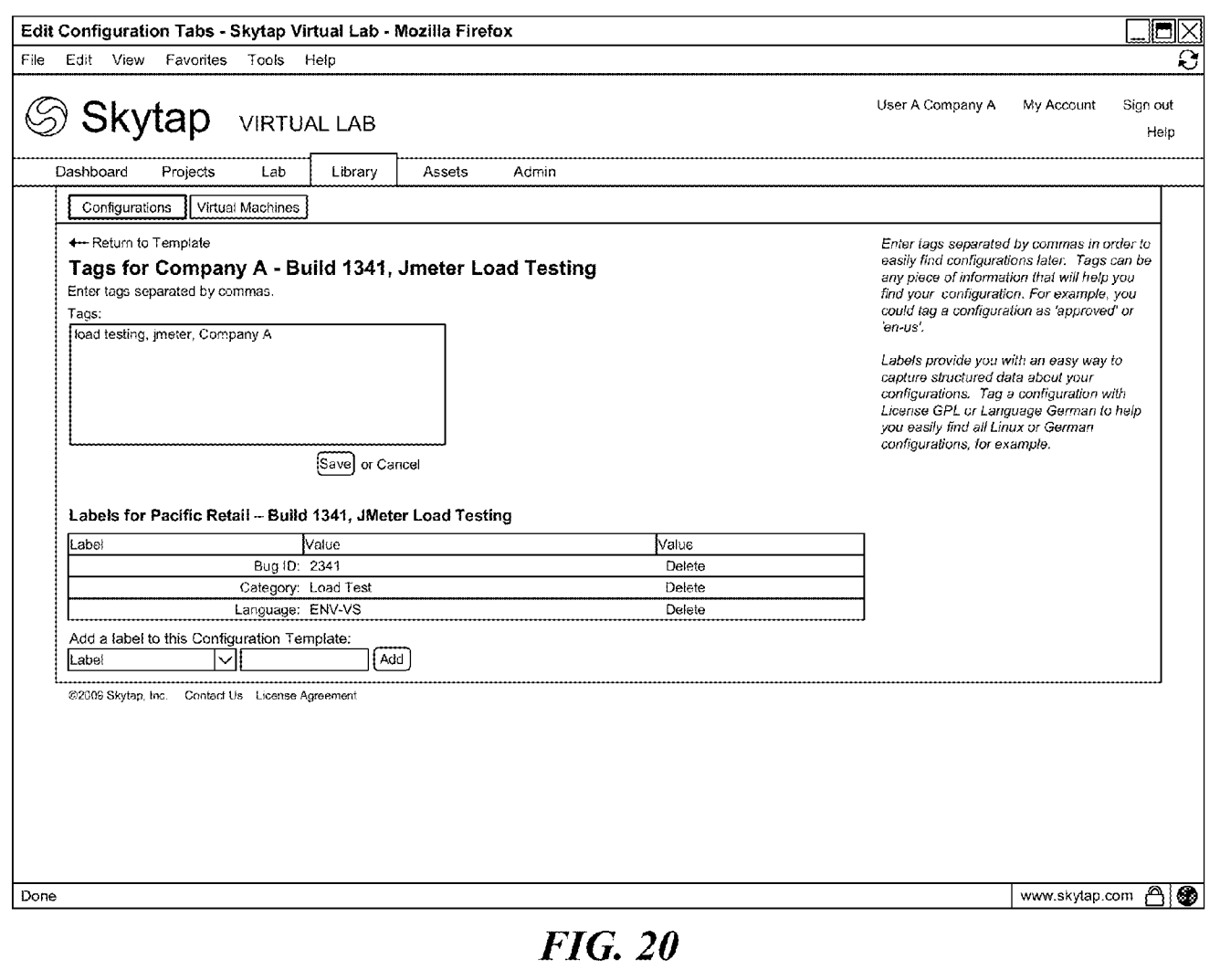

FIGS. 18 through 20 illustrate a library of virtual machine configurations available to the engineer within the virtual lab service. The library includes images of configurations that have been preinstalled with common operating systems, databases and applications. By creating a lab from pre-installed images, the user can save hours of manual installation tasks.

Configurations 1805 shown in FIG. 18 have all been installed in the lab of FIG. 11. These and other configurations such as those illustrated in FIG. 19 can be installed in labs or added to currently running configurations by actuating buttons within the interfaces shown in FIGS. 18 and 19. Although the engineer may create labs from predefined configurations, the engineer could alternatively assemble and configure new machine configurations from scratch by specifying a new combination of virtual hardware, operating system, and so on. The engineer could then add the new configuration to an existing lab or create a new lab through the virtual lab service. In general, any new configurations created by a user be associated with that user or shared among other users within the MTVMI.

Where a single user or tenant runs multiple instances of a single network within the virtual lab service, the different instances are generally fenced off from each other. Fencing is typically accomplished by using a virtual private network to establish a separate virtual LAN for each network instance. In some embodiments, the virtual machines in each of the instances of the network are assigned the same set of IP addresses. Accordingly, to provide independent access to the Internet for the virtual machines of each of the instances of the network, the network nodes and/or the firewall proxy requests from these virtual machines to the Internet, enabling the proxy to route the reply from the Internet to the correct one of the virtual machines having the source IP address associated with the original request. In various embodiments, this proxying is performed in a variety of ways, such as mapping each virtual machine instance to a different public IP address, URL, or combination or URL and port number.

Returning to FIG. 11, to test the e-commerce web site, the engineer runs the web site on the virtual machine designated as web server 1105. While running the web-site, web server 1105 stores and retrieves data from a virtual machine designated as a database server 1115. Three virtual machines having a variety of configurations are designated as test clients 1110 for generating traffic for the web-site. Finally, a virtual machine designated as a test controller 1120 controls test clients 1110 to perform the test.

Figure 21:
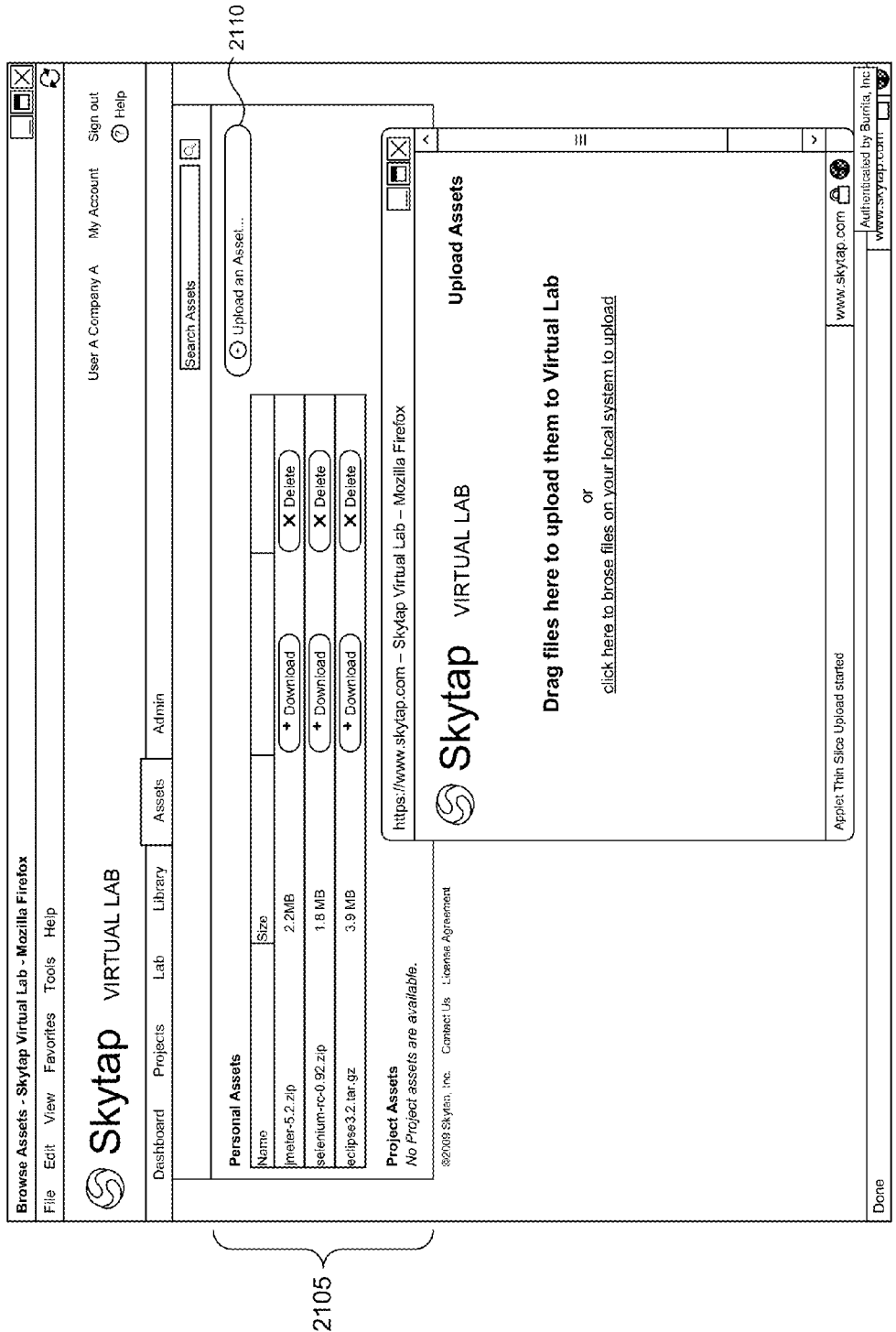

FIG. 21 illustrates techniques that can be used to organize and share work within the virtual lab application. In particular, FIG. 21 illustrates test assets 2105 (i.e., test result data—an asset can be any proprietary data) that have been generated by tests performed by the engineer within the virtual lab service. Using control 2110, the engineer can upload the assets into a library available to the public or to other users associated with the same tenant. This allows the engineer to share the assets with other users. Once the assets have been uploaded to a library within the virtual lab service, the assets can be added to projects, as illustrated, e.g., by the information under the "assets" label in FIG. 10. By adding the assets to a project, the assets become available to other users assigned to the project. Additionally, web browsers and other tools executing on a virtual machine may be used to "pull" data and/or programs to a virtual machine from the Internet.

Figure 22:
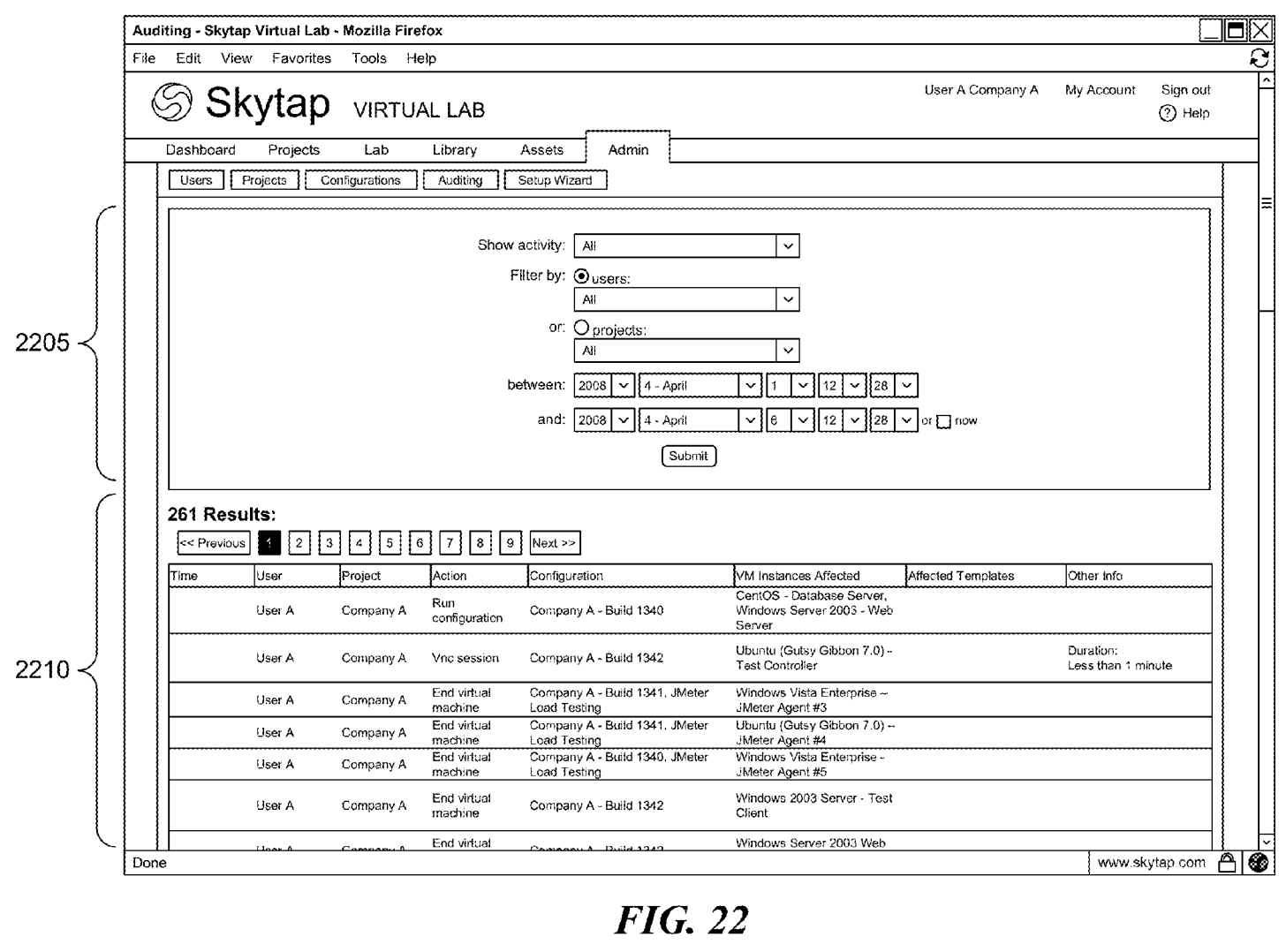

FIG. 22 shows an aspect of the virtual lab application that allows an administrator to monitor use of the virtual lab service. To monitor specific types of usage, the administrator may select various parameters from drop down menus in an area 2205. For instance, the administrator may select a certain type of activity to monitor, such as CPU usage, memory usage, etc. Alternatively, the administrator may choose to monitor activity of certain users, activity around certain dates, and so on. Activity that falls within the parameters specified in area 2205 is displayed in an area 2210.

FIG. 23 is a display diagram showing a sample display typically presented by the infrastructure to show the consumption of resources relative to quotas across an entire customer as well as by an individual user. The display 2300 includes a section 2310 about consumption relative to quotas for the customer, and section 2320 for consumption versus quotas for the current user. The rows in each section are divided into two columns: usage column 2301 that shows the amount that has been used by the entity and limit column 2302 that shows the quota to which consumption is limited for the entity. The customer section 2310 includes row 2311 for number of hours that a virtual machine operates; row 2312 for the number of virtual machines allocated; row 2313 for the volume of persistent storage allocated; and row 2314 for the number of public IP addresses allocated. Section 2320 for the individual user includes corresponding rows 2321-2323, showing the user's consumption and the user's limit as contrasted with the customer's total usage and limit. The display also includes a more concise version 2350 of this information that is suitable to be displayed on a variety of pages containing a variety of other information.

Figure 24:
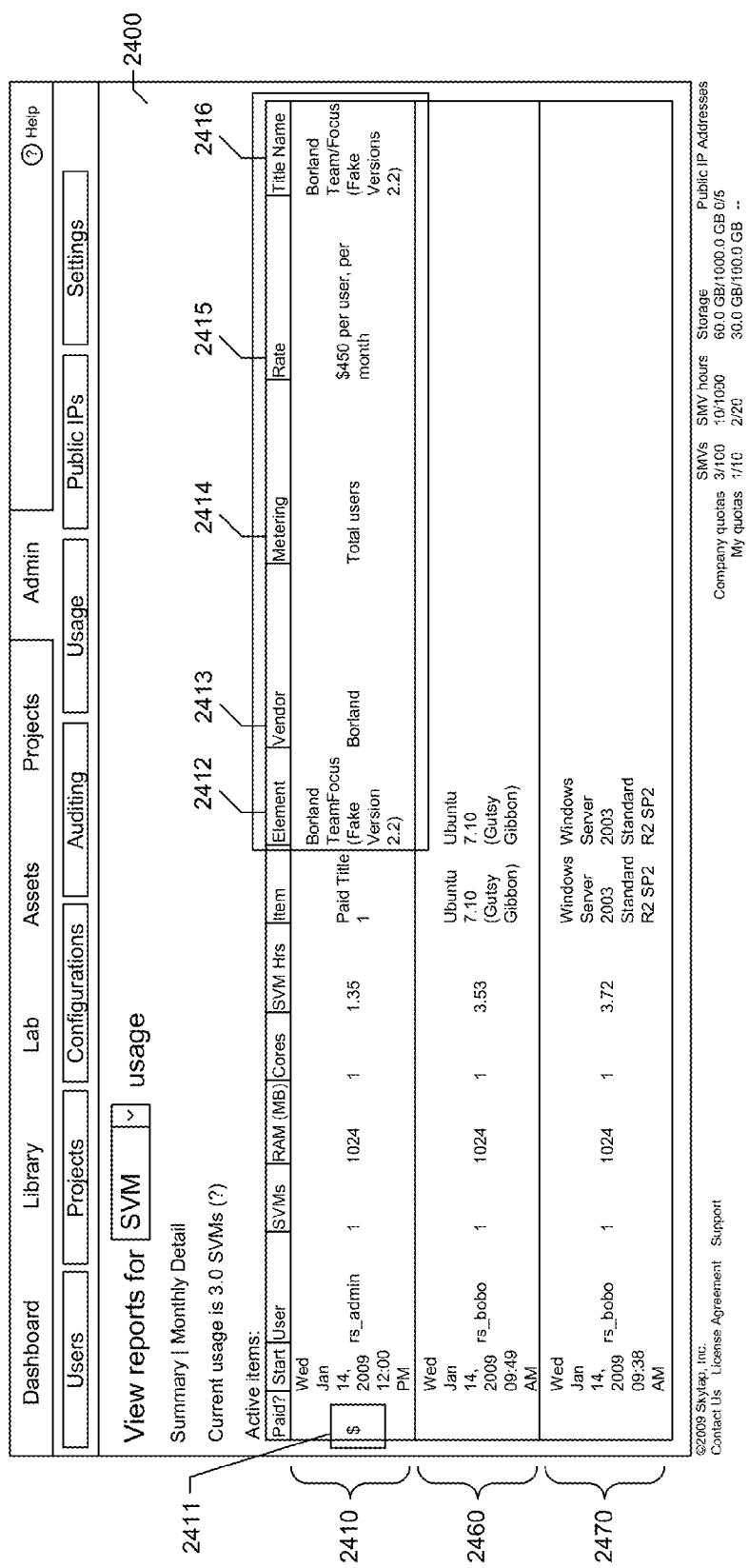

FIG. 24 is a display diagram showing a display typically presented by the infrastructure to report on usage of resources including paid resources accessed via the marketplace. In a list of resources 2310, 2360, and 2370, a paid item icon 2311 indicates that resource 2310 is paid. The entry includes information about the paid item including information 2312 and 2316 identifying the item, information 2313 identifying the vendor, information 2314 indicating the basis for which the item is metered for payment, and information 2315 indicating the cost of consuming the item.

In some embodiments, a tenant may specify specific levels of service to be provided by the MTVMI. For example, the tenant may specify that its labs run in a dedicated virtual machine host node, and/or access a dedicated storage node; specify that physical processor utilization be no greater than a level such as 75% on the virtual machine host nodes on which its labs execute; or specify a maximum level of resources of one or more types that the tenant can consume in a particular period of time. In some embodiments, where quotas are specified for a tenant, either by the tenant or the operator of the MTVMI, the MTVMI displays usage relative to the quota to one or more of the users for the tenant.

The MTVMI is unique in delivering virtual datacenter Labs as a service over the Web based on a multi-tenant shared infrastructure. It provides key capabilities valued by customers in the initial target markets—QA, Staging, Training, and Pre-sales PoC—including:

End users can use just an Internet browser to rapidly and easily create and operate private virtual data center environments (Labs)—clusters of virtual machines with desired network architecture and storage resources—without relying on IT support.

Create custom data center configurations that are a near replica or extension of environments in their internal data center.

Multiple concurrent instances of identical configurations can be cloned and run quickly and easily.

Distributed teams can collaborate efficiently and securely.

These capabilities and their underlying technology include:

Multi-Tenant Virtual Lab as a Service with Independent Account Administration

Virtual Lab management application architected as a multi-tenant service: each "tenant" is a multi-user customer who is provided authenticated and secure access only to their account and their virtual resources with no access to the underlying platform or to other accounts.

Account management architecture and data model designed to support Project Management needs of mature organizations: each account independently supports multiple users, hierarchy of roles and administration privileges, organization of users and Virtual Lab assets in Projects with access control, quota management, overall account and Project-level resource usage accounting and auditing.

Software Library Services for Rapid Creation of Custom Configurations (to Emulate Production, for e.g.)
  Multiple methods to build custom virtual machines: upload and install complete virtual machine images, OS installation packages on raw virtual machine containers, or application installation packages on pre-built virtual machine images.
Create and Manage Custom Virtual Data Center in the Cloud
  Create isolated virtual datacenters with wide flexibility in auto-assigning or user-configuring virtual machine attributes and identities (e.g., number of cores, amount of RAM, domain name, IP addresses etc.); policy hooks that enable multi-tenant aware resource allocation decisions (e.g., for security isolation, performance isolation etc.).
  Mechanisms to comprehensively save the state of entire data center configuration including the virtual machines, their storage, their network identities, their network service profiles so that they can be exactly replicated later.
Control Network Configuration of Virtual Data Center and Bridge to Own Internal Data Centers
  Software-based mechanisms to automatically configure isolated network services for each virtual data center, including DHCP and DNS, VPN services and file share services. Ready connectivity from a virtual data center configuration back to internal data centers.
Storage Virtualization for Fast and Comprehensive Cloning
  Distributed file system management architecture which supports fast snapshot and cloning operations in a scalable way, including data placement, data migration, and load balancing. The implementation is designed to be hypervisor-agnostic.
Use Commercial Library Items Available in the Library on a Pay-Per-Use Basis
  Architecture, data model, workflows, and metering for supporting paid library services. Mechanisms for providers to upload pay-for-use content with the required metadata attributes, mechanisms for consumers to discover content, and mechanisms for metering, enforcing, and billing consumers for period of usage.
UI/Console Services for Internet Based Secure Access and Sharing
  Desktop protocol proxy for remote display of single machine and multi machine environments. Mechanism for controlling desktop access privileges for various classes of users.

Figure 25:
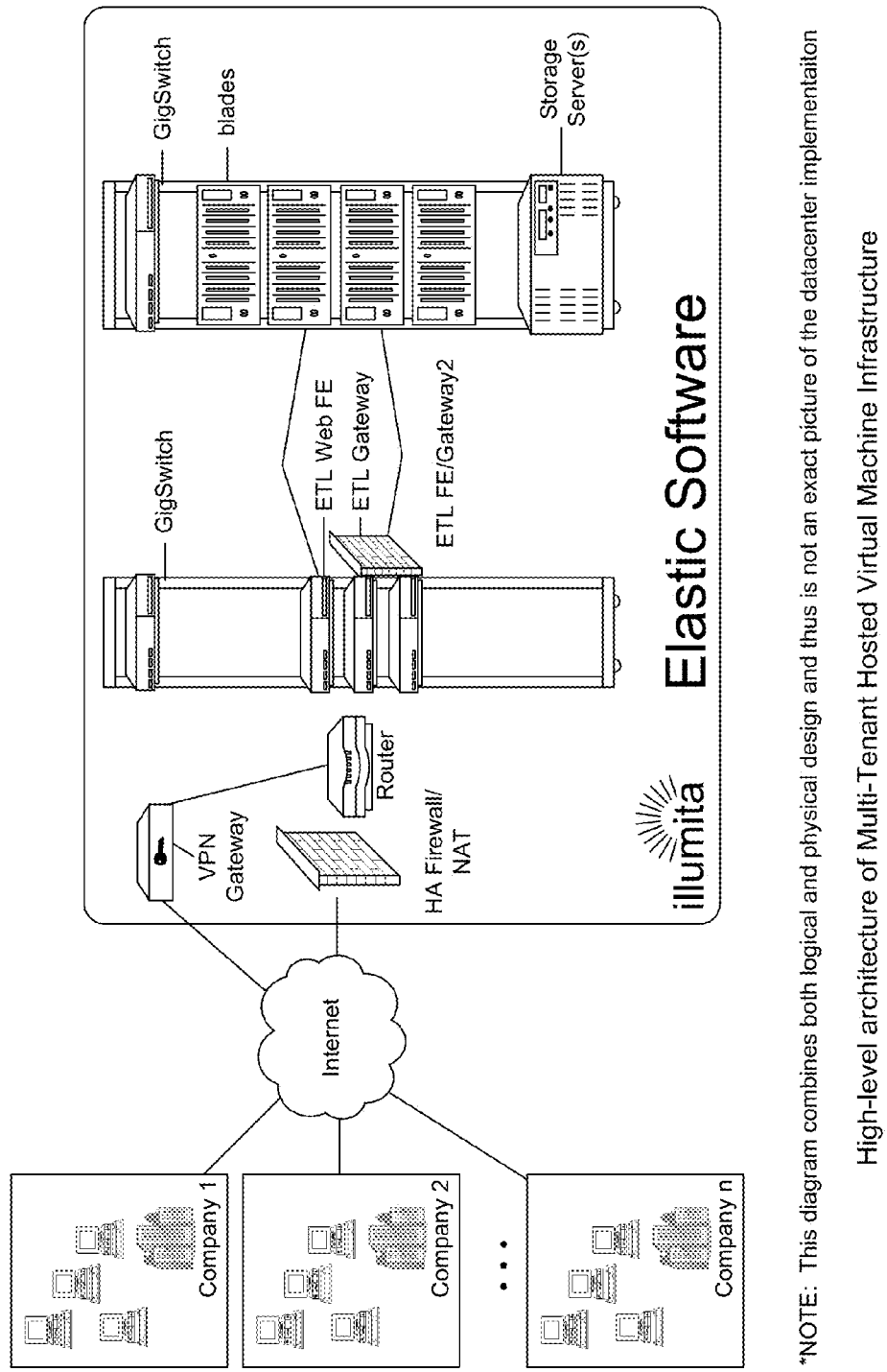
Figure 26:
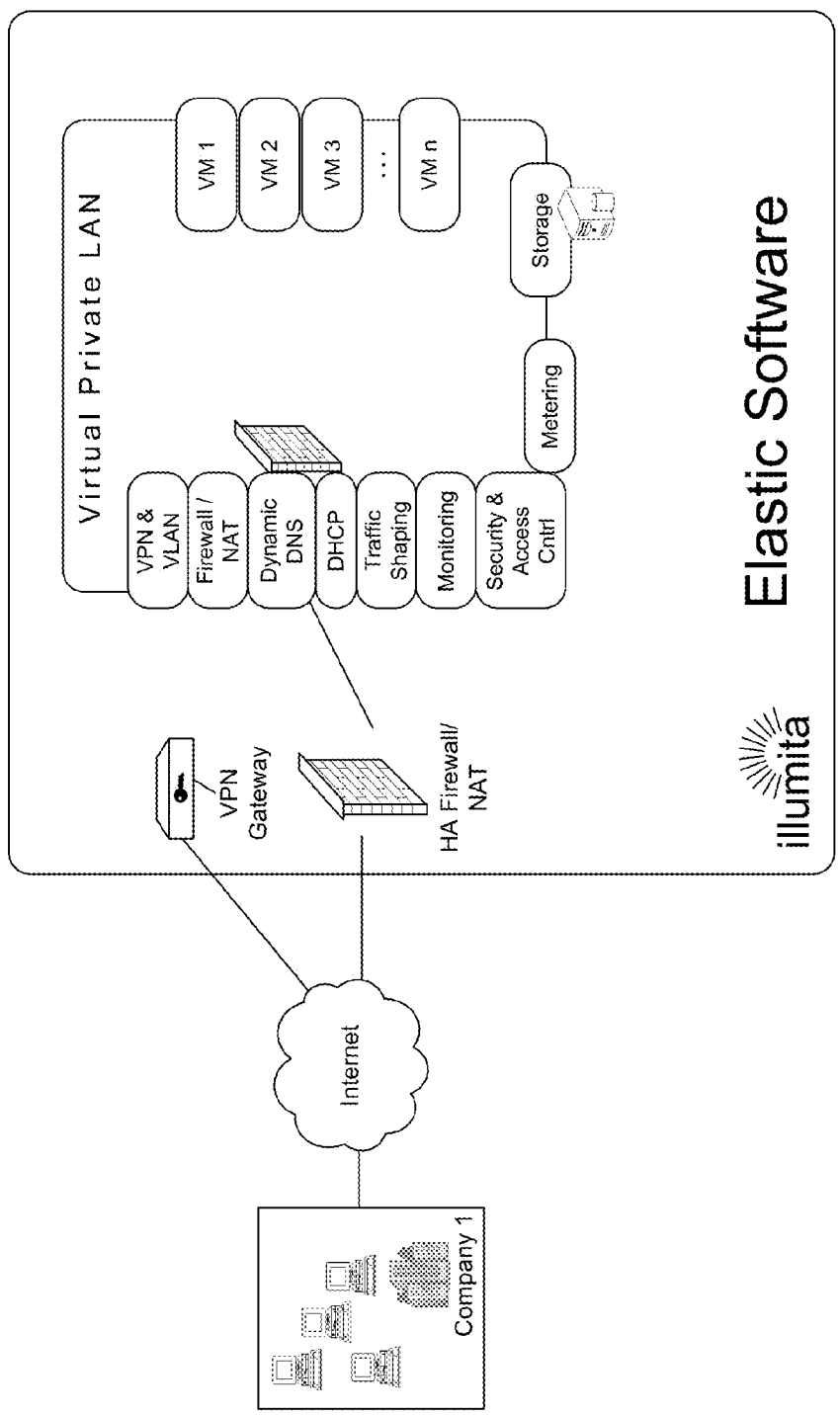

FIGS. 25-26 show additional conceptual diagrams illustrating the organization of the MTVMI in some embodiments. FIG. 25 shows the physical arrangement of hardware components of the MTVMI in some embodiments. FIG. 26 shows some of the services provided in connection with virtual private local area networks in some embodiments.

Figure 29:
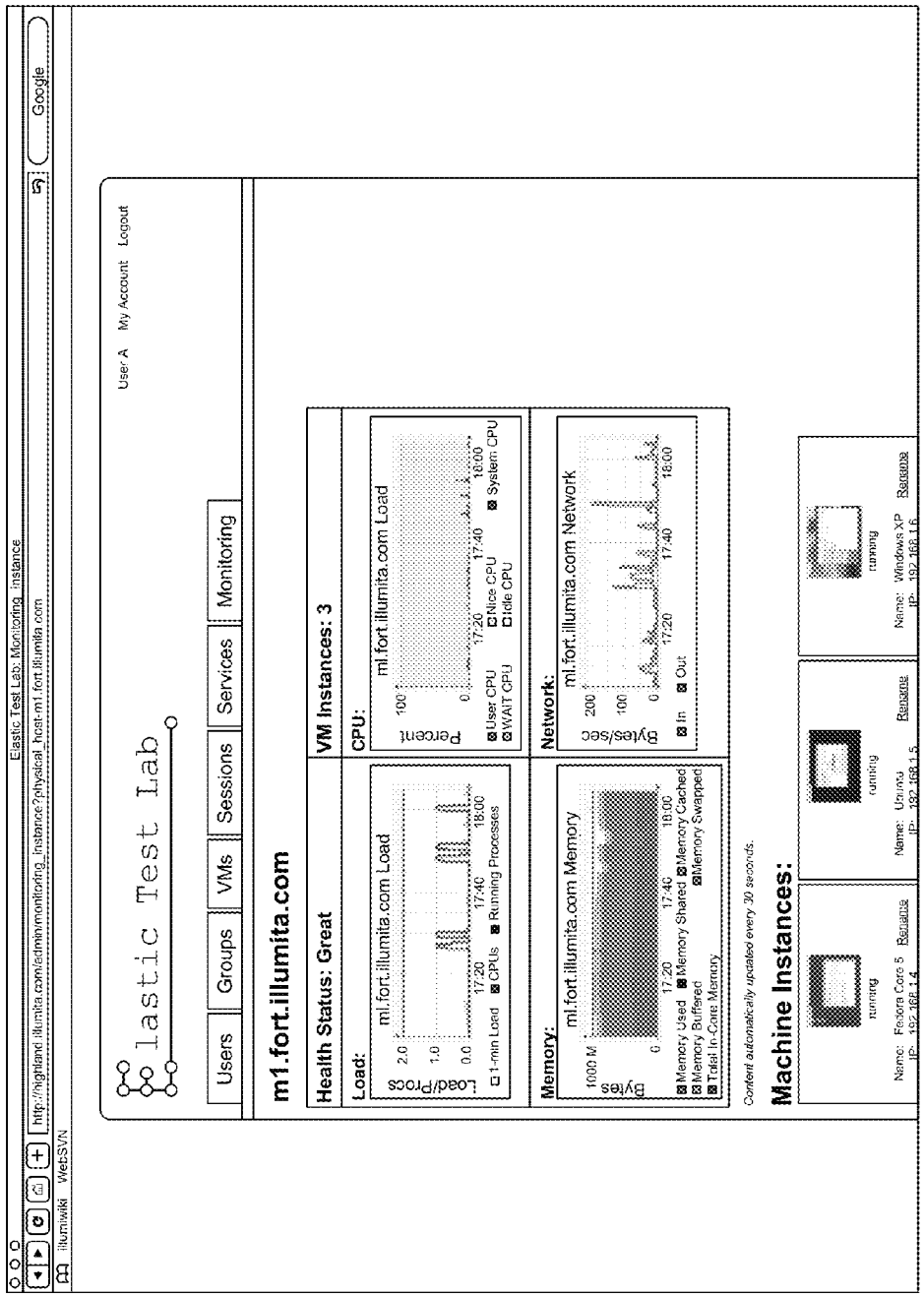
Figure 31:
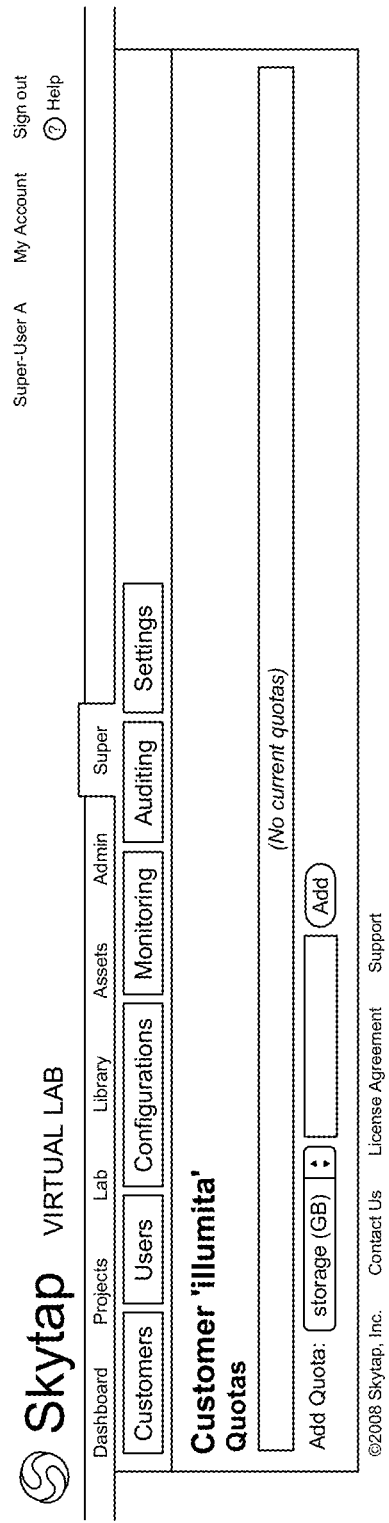
Figure 41:
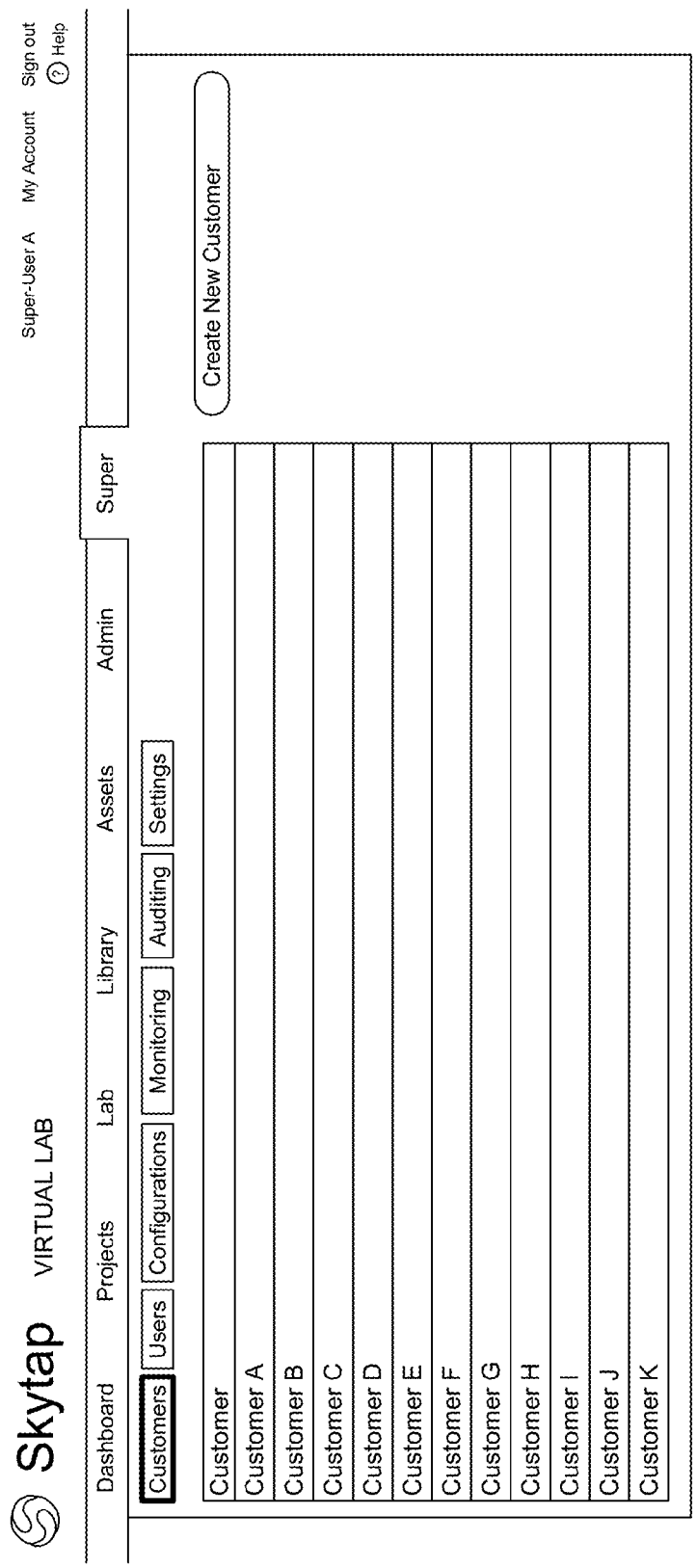
Figure 44:
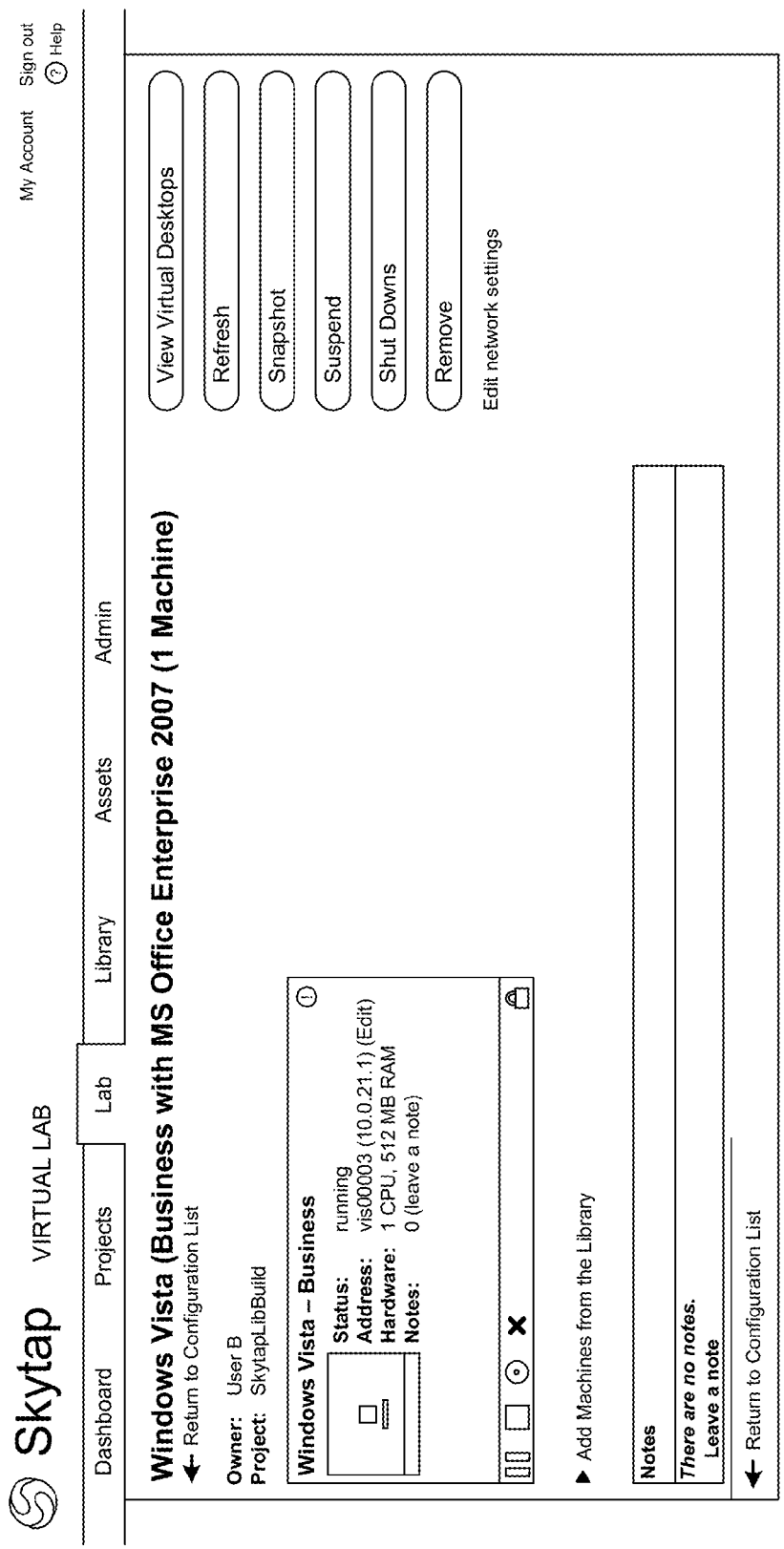
Figure 45:
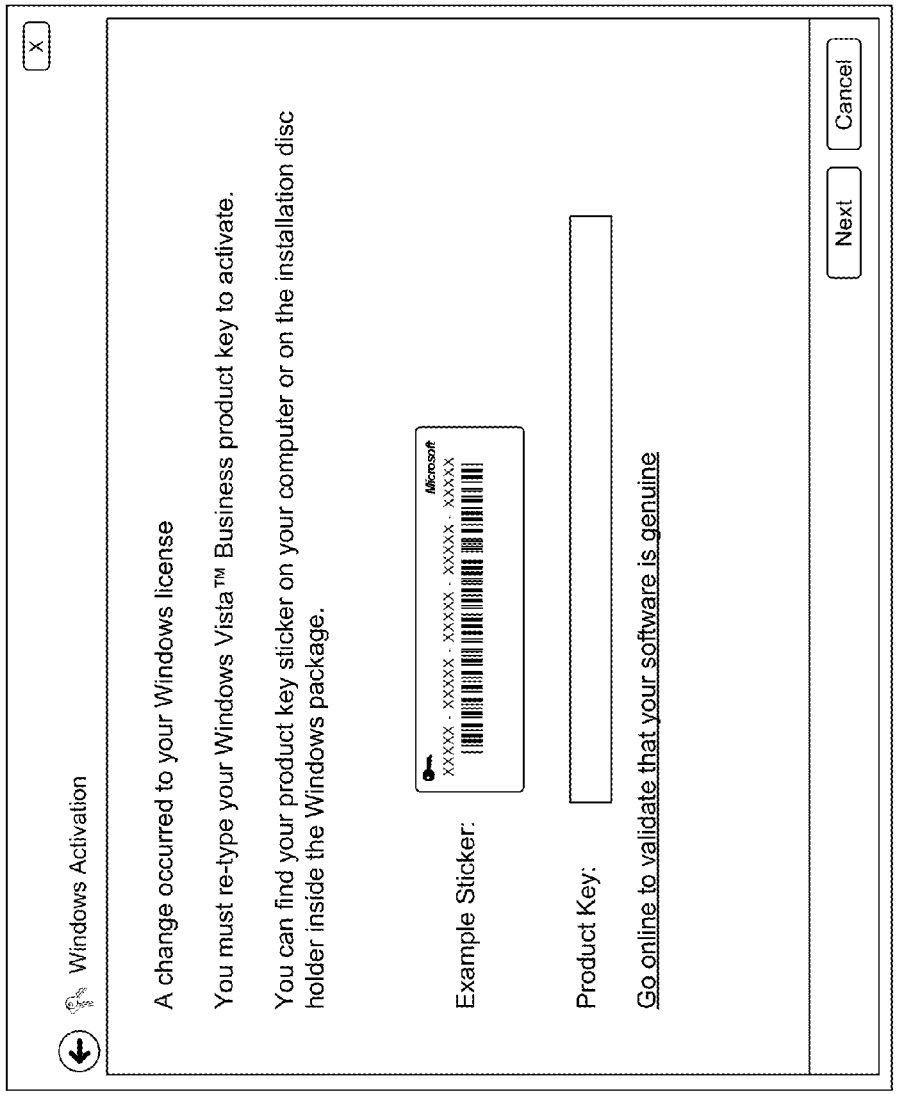
Figure 46:
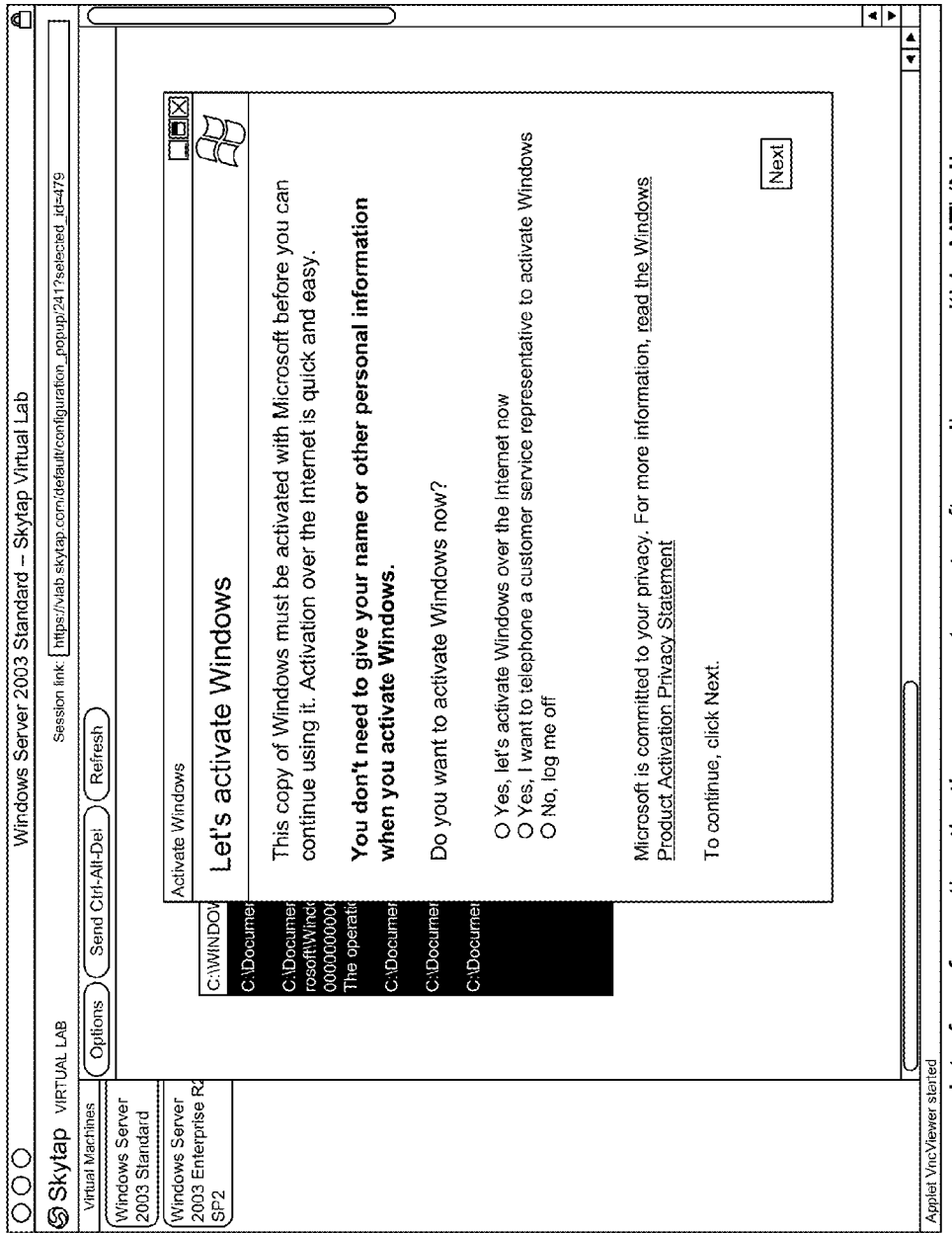
Figure 50:
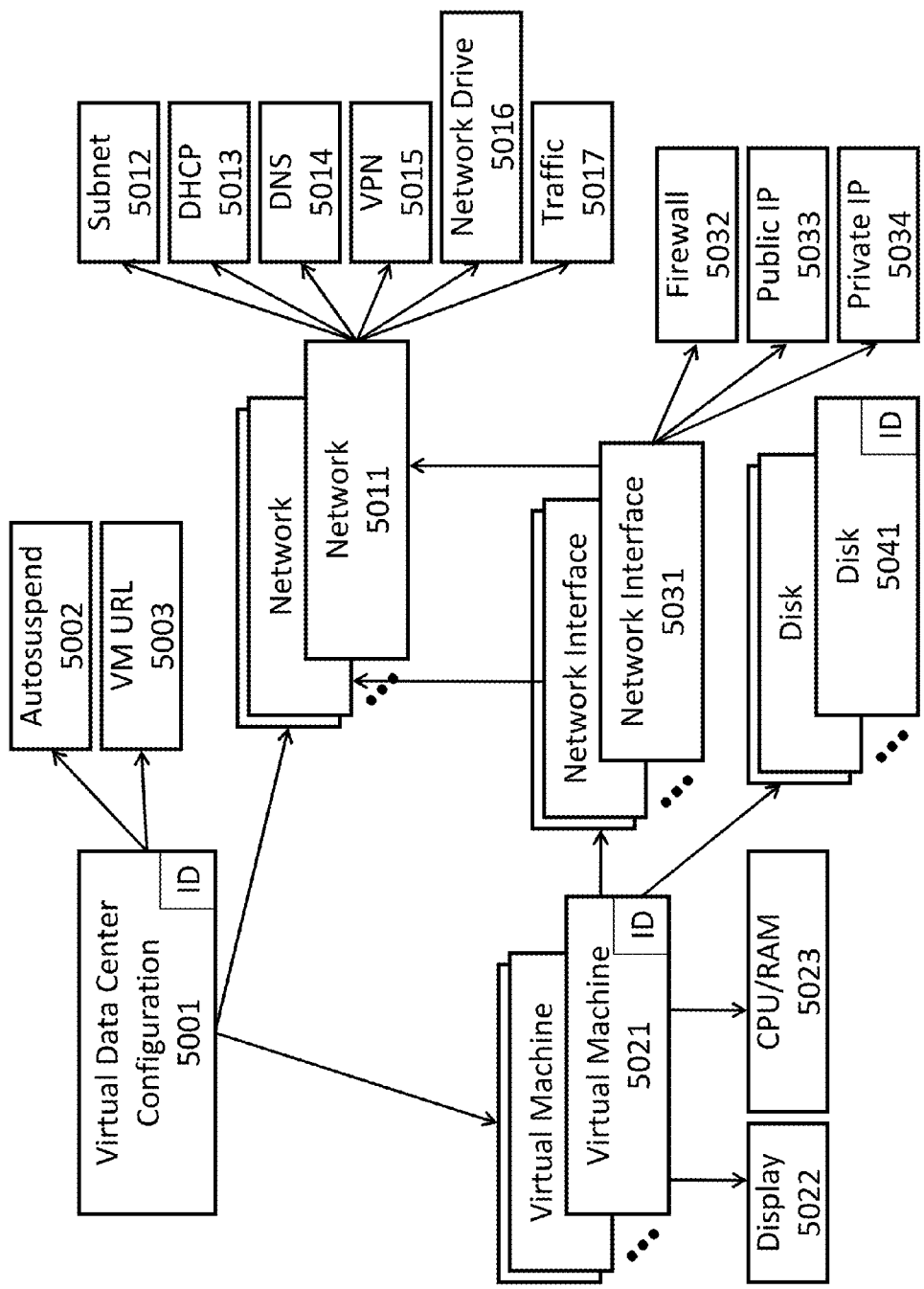
FIG. 50 is a block diagram illustrating a data model representation of virtual data centers in the MTVMI management application in some embodiments.
Figure 51:
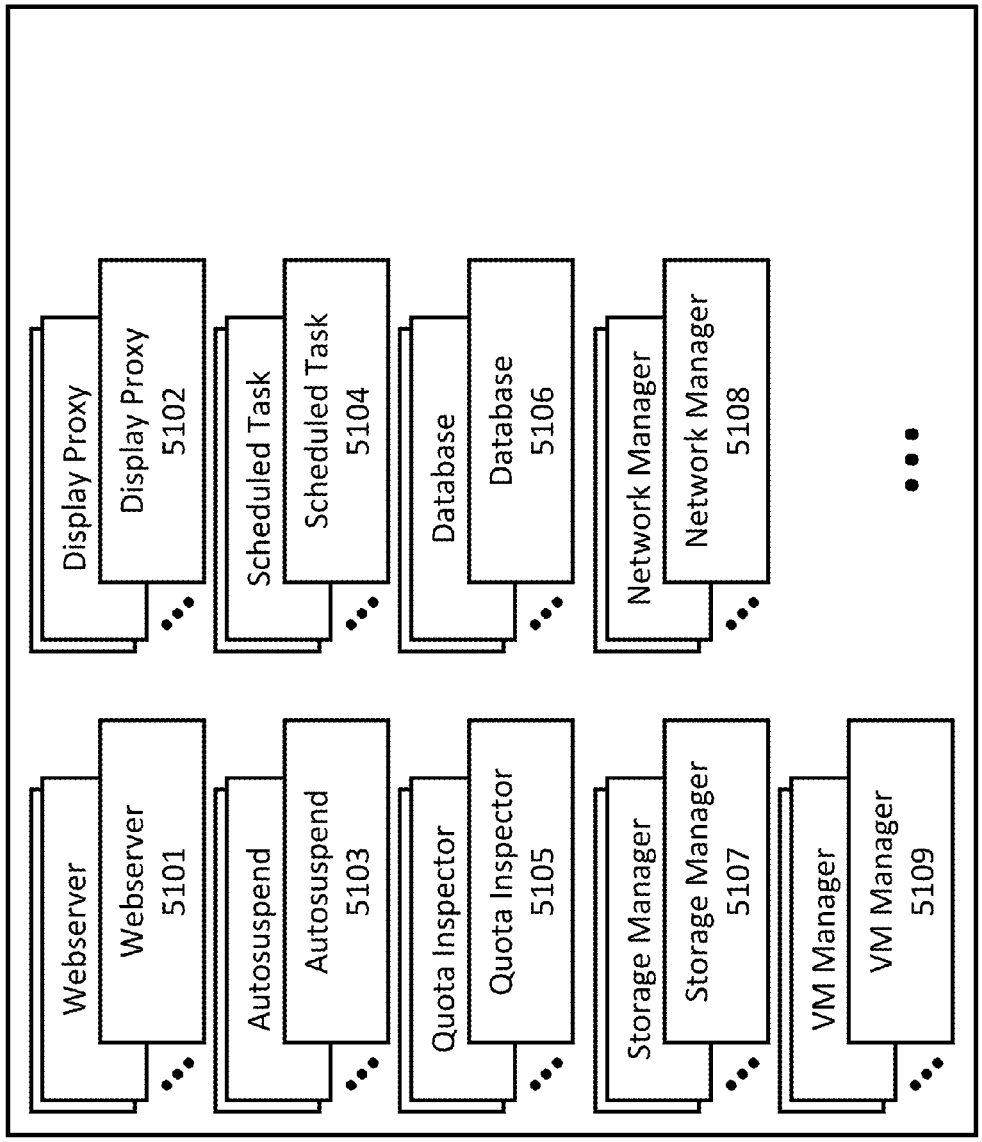
FIG. 51 is a block diagram illustrating component processes in the MTVMI management application in some embodiments.

FIGS. 27-46 are display diagrams showing displays presented by the MTVMI in some embodiments. FIG. 27 shows a display enumerating available configuration templates that is presented in some embodiments. FIG. 28 shows a display presenting information about a single configuration template that is presented in some embodiments. FIG. 29 shows a display for monitoring tenant resort resource usage that is presented in some embodiments. FIG. 30 shows a display that a tenant to configure user access permissions that is presented in some embodiments. FIG. 31 shows a display that enables a tenant quota to be specified that is presented in some embodiments. FIG. 32 shows a display for auditing resource usage across tenants that is presented in some embodiments. FIG. 33 shows a display for monitoring tenant resource usage with respect to quotas that is presented in some embodiments. FIG. 34 shows a display for monitoring the status of virtual machine host nodes is presented in some embodiments. FIG. 35 shows a display for controlling network settings for a virtual local area network is presented in some embodiments. FIG. 36 shows a display for reviewing and modifying project settings that is presented in some embodiments. FIG. 37 shows a display for navigating information associated with a virtual lab service is presented in some embodiments. FIG. 38 shows a display identifying users associated with a tenant that is presented in some embodiments. FIGS. 39 and 40 are displays showing available virtual machine configurations that is presented in some embodiments. FIG. 41 shows a display identifying tenants is presented in some embodiments. FIG. 42 is a display identifying users associated with each tenant that is presented in some embodiments. FIG. 43 is a display showing assets available within the virtual lab service is presented in some embodiments. FIG. 44 is a display showing information about a virtual machine configuration is presented in some embodiments. FIG. 45 shows a display for authenticating a third-party software license purchased by a tenant is presented in some embodiments. FIG. 46 shows a display for activating a pre-installed instance of an operating system using a license key owned by a tenant that is presented in some embodiments. It can be seen that the display includes tabs, such as tabs "Windows Server 2003 Standard" and "Windows Server 2003 Enterprise R2 SP2," that each refer to a different virtual machine. The user can of the corresponding virtual machine.

FIGS. 47-49 show a user interface designed for use by vendors offering items for sale via the marketplace. FIG. 47 is a display diagram showing a sample display typically presented by the infrastructure in order to register a new vendor for the marketplace. The display enables a user associated with the vendor to enter the following information about the vendor: the company name 4701 of the vendor; the company address 4702 of the vendor; the contact name 4703 of a contact at the vendor; the email address 4704 of the contact; a phone number 4705 of the contact; and a password 4706 to be used by the vendor to access a vendor portal for interacting with the marketplace. The user can select a submit control 4710 to generate a profile that is based upon the inputted information.

FIG. 48 is a display diagram showing a sample display typically presented by the infrastructure in order to enable a vendor to list a new item for sale in the marketplace. The display 4800 is typically made available to a user associated with the vendor in response to that user signing into the vendor portal on behalf of the vendor. The display includes information 4801 identifying the vendor. The user can use the display to input the following information about the item to be listed: the name 4811 of the item; a description 4812 of the item; a support link 4813 for the item; and a date 4814 on which the listing will expire. The user may also input pricing for any of a number of different pricing schemes, including: the per month cost 4821 for each user who uses the item; the per year cost 4822 for each user who uses the item; the per hour charge 4823 for the item; and the one-time charge 4824 per user for using the item. Typically, if the user does not enter a price in one of these fields, the option is not offered as a basis on which buyers can purchase the item. The display further includes controls 4831 and 4832 for specifying a path to the file containing the item that is to be uploaded to the infrastructure from the vendor's computer system. The user can select submit control 4840 in order to create a listing in accordance with the inputted information.

FIG. 49 is a display diagram showing a sample display typically presented by the user in order to account to a vendor for revenue generated by the vendor's items in the marketplace. The display 4900 shows a period 4901 such as a month, to which the displayed accounting applies. The user can select controls 4902 or 4903 to navigate to display an accounting for other periods of time. The display includes a table in which each row corresponds to a particular basis for charging customers for a particular item. These rows are grouped into group 4920 for the Crossbow Debugger item and group 4930 for the Image Cropper item. Each row is divided into the following columns: an item column 4911 identifying the item; a rate column 4912 identifying the rate charged to users for the payment option to which the row corresponds; a units column 4913 showing the number of units of that charging option that were consumed by customers during the selected period; a revenue column 4914 showing the revenue produced in connection with the current item and charging option during the selected period; and an item title total column 4915 showing, for the last row of each group, the amount of revenue generated by the item during the selected period. The display also includes an indication 4940 of the gross revenue for the selected period, and an indication 4950 showing the portion of the revenue that is retained to support the operation of the marketplace, and an indication 4960 of the net revenue to the vendor for the selected period.

In view of the foregoing, it should be appreciated that, while selected embodiments have been described herein for illustration purposes, various modifications may be made without deviating from the scope of the invention. Accordingly, the invention is not limited except as by the appended claims and the elements explicitly recited therein.

We claim:

1. A method in a computing system including at least one processor for making commercial products available for use in a hosted multi-tenant virtual machine infrastructure, comprising:
    for each of a plurality of commercial products at least partially managed by an operating system executed by a CPU associated with a virtual machine provided by a virtual data center that is part of a hosted multi-tenant virtual machine infrastructure (MTVMI):
        receiving data constituting a commercial product from a provider of the commercial product, wherein the virtual data center includes the virtual machine and one or more:
            virtual nodes,
            additional virtual machines, and/or
            data storage requests;
        receiving information describing the commercial product;
        for each of a plurality of charging options, receiving from the provider of the commercial product a price to be charged to a plurality of users of the virtual data center who select the charging option;
        for at least a first user of the plurality of users of the virtual data center, for each of at least a portion of the plurality of commercial products, sending for display to the at least first user the received information and the received prices in connection with their corresponding charging option;
        receiving an indication that the first user of the plurality of users has selected one of the commercial products and one of the plurality of charging options; and
        making the commercial product available, by at least the virtual machine, for use by the first user in the virtual data center, wherein CPU usage is concurrently shared between the first user and at least a second user of the plurality of users of the virtual data center;
        monitoring CPU usage of the commercial product by the first user and the second user, wherein monitoring includes:
            determining a first level of CPU usage used when the first user operates the commercial product on the CPU, wherein the first level of CPU usage is a first amount of time that the first user operates the commercial product on the CPU, wherein the first amount of time includes a second amount of time that the first user operates the commercial product on the CPU contemporaneously with the second user operating the commercial product on the CPU; and
        charging to an account associated with the first user an amount based upon:
            the received price, and
            the first level of CPU usage; and
        for each of the plurality of commercial products, causing the provider of the commercial product to be paid at least a portion of a total amount charged for the commercial product.

2. The method of claim 1 where the charging options include at least one of monthly subscription, annual subscription, hourly metered, and permanent license.

3. A computer-readable storage device which is not a signal per se whose contents, when executed by at least one processor of a computing system, cause the computer system to perform a method for making commercial products available to users operating virtual machines provided by a virtual data center of a hosted multi-tenant virtual machine infrastructure (MTVMI),
    the virtual data center of the hosted MTVMI having at least one virtual machine, wherein the at least one virtual machine has at least one virtual CPU, wherein virtual CPU usage associated with executing a commercial product on top of an operating system of the at least one virtual machine is contemporaneously shared between at least two users accessing the same at least one virtual machine provided by the virtual data center of the hosted MTVMI, the method comprising, for each of a plurality of commercial products:
        receiving data constituting a commercial product from a provider of the commercial product,
        for each of a plurality of charging options, receiving from the provider of the commercial product a rate to be charged for use of the commercial product on the at least one virtual machine having the CPU,
        for each of the at least two users, determining an amount of time that the user the operates the commercial product on the CPU, wherein the determined amount of time includes an amount of time that the user operates the commercial product on the CPU contemporaneously with at least one other user's operation of the same commercial product on the CPU, wherein operating commercial product comprises causing a virtual CPU of the at least one virtual machine of the virtual data center of the hosted MTVMI to execute the commercial product on top of the operating system, and
        for each of the at least two users, determining a price for the user's use of the commercial product based on the received rate and the determined amount of time used by the commercial product while the commercial product was operated by the user.

4. The computer readable storage device of claim 3 wherein the charging options include at least one of monthly subscription, annual subscription, hourly metered, and permanent license.

5. A computing system, including at least one processor, for making commercial products available to users operating virtual machines povided by a virtual data center of a hosted multi-tenant virtual machine infrastructure (MTVMI), the virtual data center of the hosted MTVMI having at least one virtual machine, wherein the at least one virtual machine has at least one virtual CPU, wherein virtual CPU usage associated with executing a commercial product on top of an operating system of the at least one virtual machine is contemporaneously shared between at least two users accessing the same at least one virtual machine provided by the virtual data center of the hosted MTVMI, the system comprising
 virtual machine management software executed on at least one of the processors to:
for each of a plurality of commercial products, receiving data constituting a commercial product from a provider of the commercial product,
receiving information describing the commercial product,
for each of a plurality of charging options, receiving from the provider of the commercial product a rate to be charged for use of the commercial product on the at least one virtual machine having the CPU,
for each of the at least two user, determining an amount of time that the user operates the commercial product on the CPU, wherein the determined amount of time includes an amount of time that the user operates the commercial product on the CPU contemporaneously with at least one other user's operation of the same commercial product on the CPU, wherein operating the commercial product comprises causing a virtual CPU of the least one virtual machine of the virtual data center of the hosted MTVMI to execute commercial product on top of the operating system, and
for each of the at least two users, determining a price for the user's use of the commercial product based on the received rate and the determined amount of time used by the commercial product while the commercial product was operated by the user.

6. The computer system of claim 5 wherein the charging options include at least one of monthly subscription, annual subscription, hourly metered, and permanent license.

7. At least one computer-readable storage device, which is not a signal per se, having instructions that when executed by a CPU cause the CPU to make software applications available for use in a virtual computing environment provided by a hosted multi-tenant machine infrastructure by users, the method comprising:
 for each of the software applications:
  receiving data constituting the software application from a provider of the software application, wherein the software application cooperates with an operating system executed by a CPU of a virtual machine provided by a software virtualization of a physical data center, wherein the software virtualization of the physical data center is part of a hosted multi-tenant virtual machine infrastructure (MTVMI);
  for each of a plurality of charging options for operating the software application within the software virtualization of a physical data center, receiving from the provider of the software application, a price to be charged to users who select the charging option for operating the software application within the software virtualization of a physical data center;
  for each of at least a portion of the users who select the charging option for operating the software application within the software virtualization of a physical data center, sending for display terms associated with the charging option;
  in response to receiving an indication that the terms were accepted by a respective one user of the at least portion of users who select the charging option, making the software application available for use in the software virtualization of a physical data center by the respective one user of the at least portion of users;
  determining an amount of time that the respective one user operates the software application on the CPU, wherein the determined amount of time includes an amount of time that the respective one user operates the software application on the CPU contemporaneously with at least one other user's operation of the same software application on the CPU, wherein operating the software application at least includes causing the software application to execute, by a CPU, on an operating system of the virtual machine of the software virtualization of a physical data center that is part of the hosted MTVMI;
  charging the respective user an amount based upon one or more of the received terms, the price and the determined amount of time that the respective one user operated the software application; and
  for each of one or more commercial products, causing the provider of the commercial product to be paid at least a portion of the total amount charged for the commercial product.

8. A method for making software applications available to users operating virtual machines provided by a virtual computing environment of a hosted multi-tenant virtual machine infrastructure (MTVMI), the virtual computing environment of the hosted MTVMI having at least one virtual processor, wherein virtual processor usage associated with executing a software product on top of an operating system of the at least on virtual processor is contemporaneously shared by at least two users accessing the same virtual processor provided by the virtual data center of the hosted MTVMI, the method comprising:
 receiving data constituting the software application form a provider of the software application,
 for each of a plurality of charging options, receiving from the provider of the software application a rate to be charged to a user of a plurality of users of the virtual computing environment who selects the charging option,
 for each of the plurality of users, in response to receiving an indication that the user who selected of charging option agreed to the rated, making the software application available for operation on the virtual machine by the user,
 for each of the plurality of users, determining an amount of time that the user operates the software application, wherein the determined amount of time includes an amount of time that the user operates the software application contemporaneously with at least one other user's operation of the same software application, wherein operating the software application comprises causing a virtual processor of the at least one virtual machine of the virtual computing environment of the hosted MTVMI, and for each of the plurality of users, charging the user an amount based on the rate and the determined amount of time that the user operated the software application.

\* \* \* \* \*

UNITED STATES PATENT AND TRADEMARK OFFICE
CERTIFICATE OF CORRECTION

| | | |
|---|---|---|
| PATENT NO. | : 9,870,238 B2 | Page 1 of 2 |
| APPLICATION NO. | : 13/627794 | |
| DATED | : January 16, 2018 | |
| INVENTOR(S) | : Astete et al. | |

It is certified that error appears in the above-identified patent and that said Letters Patent is hereby corrected as shown below:

On sheet 10 of 52, in Figure 11, reference numeral 1120, Line 1, delete "Contoller" and insert -- Controller --, therefor.

On sheet 20 of 52, in Figure 21, Line 18, delete "brose" and insert -- browse --, therefor.

On sheet 24 of 52, in Figure 25, Line 9, delete "implementaiton" and insert -- implementation --, therefor.

On sheet 26 of 52, in Figure 27, Line 23, delete "neopolitan." and insert -- neapolitan. --, therefor.

On sheet 39 of 52, in Figure 40, Line 10, delete "Prfessional" and insert -- Professional --, therefor.

On sheet 39 of 52, in Figure 40, Line 14, delete "Lanugage:" and insert -- Language: --, therefor.

In Column 6, Lines 38-50, delete "MTVMI management application 115 controls and monitors interactions between tenants and MTVMI 100. Additionally, MTVMI management application 115 allocates resources among different tenants and coordinates the use of MTVMI 100 by the different tenants. Various management related tasks performed by MTVMI management application 115 may include, as examples, authenticating users, allocating CPU time and storage space among different tenants, maintaining logical isolation between different tenants, tracking each tenant's usage of MTVMI 100, and many others. Additional examples of specific functions that can be performed by MTVMI management application 115 are described below in relation to FIG. 6." and insert the same on Column 6, Line 38 as a new paragraph.

In Column 9, Line 10, delete "tenant," and insert -- tenant --, therefor.

In Column 9, Line 34, delete "hyperviser" and insert -- hypervisor --, therefor.

In Column 11, Line 26, after "nodes" insert -- . --.

Signed and Sealed this
Twenty-sixth Day of June, 2018

Andrei Iancu
*Director of the United States Patent and Trademark Office*

CERTIFICATE OF CORRECTION (continued)
U.S. Pat. No. 9,870,238 B2

In Column 14, Line 59, delete "creates," and insert -- creates --, therefor.

In Column 25, Line 9, in Claim 5, delete "povided" and insert -- provided --, therefor.

In Column 25, Line 30, in Claim 5, delete "user," and insert -- users, --, therefor.

In Column 26, Line 45, in Claim 8, delete "on" and insert -- one --, therefor.

In Column 26, Line 49, in Claim 8, delete "form" and insert -- from --, therefor.

In Column 26, Line 58, in Claim 8, delete "rated," and insert -- rate, --, therefor.